US010063009B2

(12) United States Patent
Szeto

(10) Patent No.: US 10,063,009 B2
(45) Date of Patent: Aug. 28, 2018

(54) METHODS AND APPARATUS FOR MAGNETICALLY CONNECTING ELECTRONIC DEVICES AT A PLURALITY OF SURFACES

(71) Applicant: NANOPORT TECHNOLOGY INC., Markham (CA)

(72) Inventor: Timothy Jing Yin Szeto, Markham (CA)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

(21) Appl. No.: 15/012,360

(22) Filed: Feb. 1, 2016

(65) Prior Publication Data

US 2016/0226182 A1    Aug. 4, 2016

Related U.S. Application Data

(63) Continuation of application No. PCT/CA2014/000803, filed on Nov. 12, 2014.
(Continued)

(51) Int. Cl.
*H01R 11/30* (2006.01)
*H01R 13/62* (2006.01)
(Continued)

(52) U.S. Cl.
CPC ......... *H01R 13/6205* (2013.01); *H01R 11/30* (2013.01); *H01R 13/22* (2013.01);
(Continued)

(58) Field of Classification Search
CPC .................................................. H01R 13/6205
(Continued)

(56) References Cited

U.S. PATENT DOCUMENTS 3,363,214 A    1/1968  Wright
5,829,987 A   11/1998  Fritsch et al.
(Continued)

FOREIGN PATENT DOCUMENTS

CN    101408781 A    4/2009
CN    101409029 A    4/2009
(Continued)

OTHER PUBLICATIONS

International Search Report and Written Opinion for PCT/CA2015/000545 dated Jan. 8, 2016.
(Continued)

*Primary Examiner* — Neil Abrams
(74) *Attorney, Agent, or Firm* — Norton Rose Fulbright Canada LLP; Alexandre Daoust

(57) ABSTRACT

There is disclosed magnetic connectors and electronic devices including such connectors. A connector may include a magnet rotatable about at least one axis of the magnet; wherein the magnet rotates to magnetically engage a magnet of another connector to form an electrical connection between the two magnets. A connector may also include a cylindrical magnet to magnetically engage a magnet of another connector; and a sleeve wrapped around at least part of the magnet, the sleeve comprising a contact for forming an electrical connection with a contact on the other connector. A connector may be adapted for selective connection with other connectors. A connector may be adapted such that a moveable magnet may move between an engaged position proximate a contacting surface of the connector and a disengaged position recessed from a contacting surface, wherein the moveable magnet is biased to the disengaged position.

22 Claims, 62 Drawing Sheets

Related U.S. Application Data

(60) Provisional application No. 62/032,955, filed on Aug. 4, 2014, provisional application No. 62/029,328, filed on Jul. 25, 2014, provisional application No. 62/016,264, filed on Jun. 24, 2014, provisional application No. 61/903,615, filed on Nov. 13, 2013.

(51) Int. Cl.
| | | |
|---|---|---|
| *H01R 13/22* | (2006.01) | |
| *H01R 43/26* | (2006.01) | |
| *H04B 5/00* | (2006.01) | |
| *H01R 24/66* | (2011.01) | |
| *H01R 43/20* | (2006.01) | |
| *H01R 13/6581* | (2011.01) | |
| *H01R 107/00* | (2006.01) | |

(52) U.S. Cl.
CPC ......... *H01R 13/6581* (2013.01); *H01R 24/66* (2013.01); *H01R 43/20* (2013.01); *H01R 43/26* (2013.01); *H04B 5/0031* (2013.01); *H01R 2107/00* (2013.01)

(58) Field of Classification Search
USPC .......................................................... 439/39
See application file for complete search history.

(56) References Cited

U.S. PATENT DOCUMENTS

| | | | |
|---|---|---|---|
| 6,561,815 B1 | 5/2003 | Schmidt | |
| 6,851,831 B2* | 2/2005 | Karlicek, Jr. .......... H01R 29/00 | 362/227 |
| 7,311,526 B2 | 12/2007 | Rohrbach et al. | |
| 7,322,873 B2 | 1/2008 | Rosen et al. | |
| 7,344,380 B2 | 3/2008 | Neidlein et al. | |
| 7,517,222 B2 | 4/2009 | Rohrbach et al. | |
| 7,611,357 B2 | 11/2009 | Han et al. | |
| 7,645,143 B2 | 1/2010 | Rohrbach et al. | |
| 7,726,974 B2 | 6/2010 | Shah et al. | |
| 7,804,966 B2* | 9/2010 | Adams .................... H04R 1/02 | 381/120 |
| 7,828,556 B2* | 11/2010 | Rodrigues .......... H01R 13/6205 | 381/394 |
| 7,901,216 B2 | 3/2011 | Rohrbach et al. | |
| 8,187,007 B2 | 5/2012 | Emde et al. | |
| 8,491,312 B2 | 7/2013 | Rudisill et al. | |
| 8,529,274 B2 | 9/2013 | Li et al. | |
| 8,894,419 B1 | 11/2014 | Beulow | |
| 9,019,718 B2 | 4/2015 | Bdeir | |
| 9,130,291 B2 | 9/2015 | Poh | |
| 9,160,102 B1 | 10/2015 | Morgan et al. | |
| 9,300,081 B2* | 3/2016 | Rudisill ............. H01R 13/6205 | |
| 9,312,633 B1* | 4/2016 | Szeto ................ H01R 13/6205 | |
| 9,502,819 B2* | 11/2016 | Szeto ..................... H01R 11/30 | |
| 9,559,456 B2* | 1/2017 | Harmon ............ H01R 13/6205 | |
| 9,597,607 B2* | 3/2017 | Bdeir ................ H01R 13/6205 | |
| 9,627,803 B2* | 4/2017 | Szeto ................ H01R 13/6205 | |
| 9,653,844 B1* | 5/2017 | Szeto ................ H01R 13/6205 | |
| 9,774,136 B2* | 9/2017 | Szeto ..................... H01R 13/22 | |
| 9,876,311 B2* | 1/2018 | Szeto ..................... H01R 13/22 | |
| 2005/0239261 A1 | 10/2005 | Tai et al. | |
| 2006/0051981 A1 | 3/2006 | Neidlein et al. | |
| 2007/0072443 A1 | 3/2007 | Rohrbach | |
| 2012/0021619 A1 | 1/2012 | Bilbrey et al. | |
| 2012/0068942 A1 | 3/2012 | Lauder et al. | |
| 2012/0295451 A1 | 11/2012 | Hyun-Jun et al. | |
| 2013/0050958 A1 | 2/2013 | Bdeir | |
| 2013/0273752 A1 | 10/2013 | Rudisill et al. | |
| 2013/0323941 A1 | 12/2013 | Zeliff et al. | |
| 2014/0065846 A1 | 3/2014 | Poh | |
| 2015/0236444 A1 | 8/2015 | Bdeir | |
| 2016/0226182 A1* | 8/2016 | Szeto ..................... H01R 11/30 | |
| 2017/0149171 A1* | 5/2017 | Szeto ................ H01R 13/6205 | |
| 2017/0310042 A1* | 10/2017 | Michelmann ...... H01R 13/6205 | |

FOREIGN PATENT DOCUMENTS

| | | |
|---|---|---|
| CN | 202455400 U | 12/2011 |
| CN | 203086539 U | 1/2013 |
| EP | 1865581 | 4/2012 |
| WO | 2014021847 | 2/2014 |
| WO | 2014184610 | 11/2014 |

OTHER PUBLICATIONS

International Search Report and Written Opinion for PCT/CA2014/000803 dated Jan. 27, 2015.

* cited by examiner

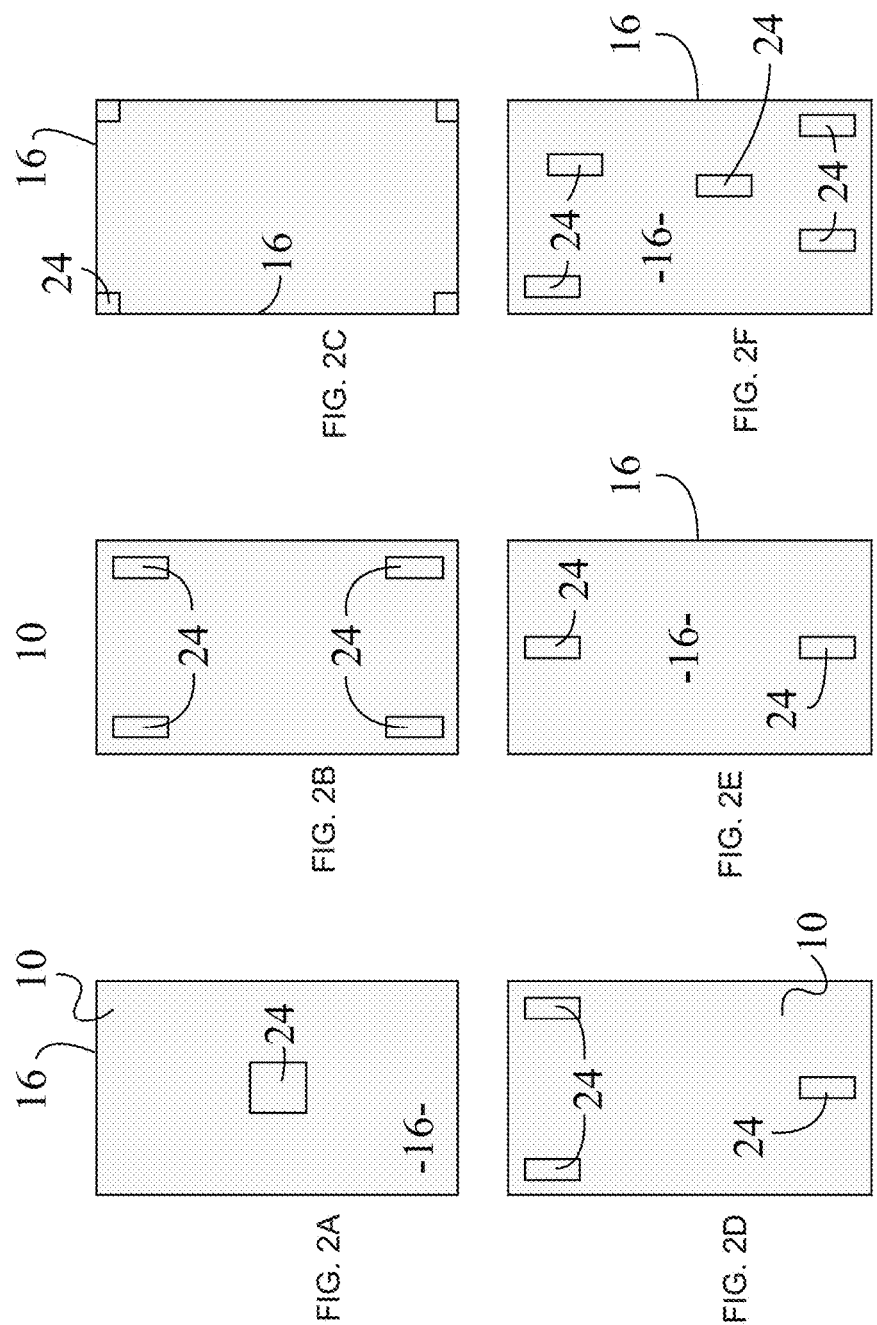

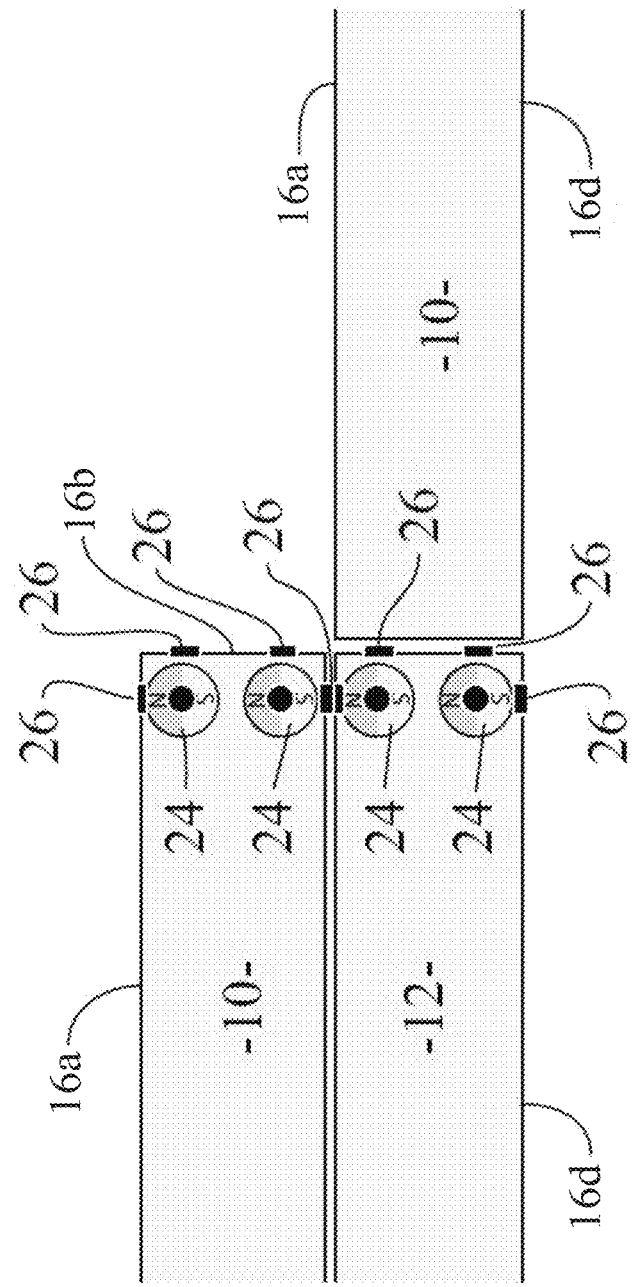

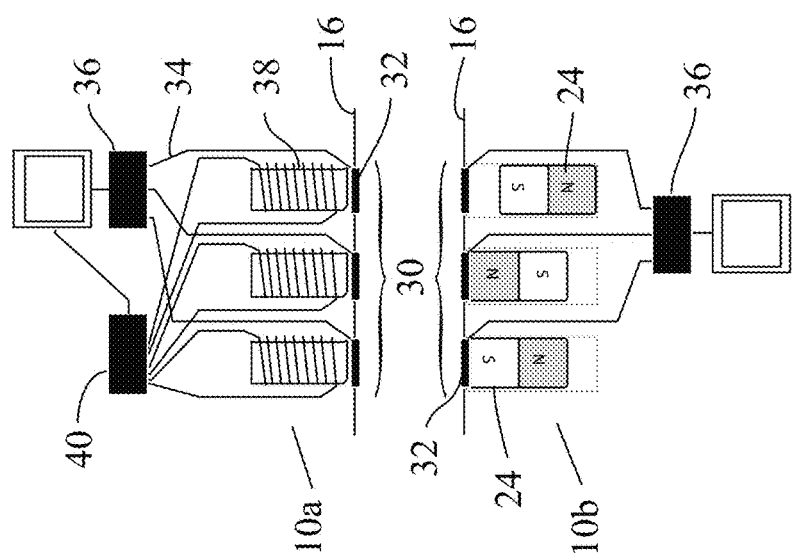

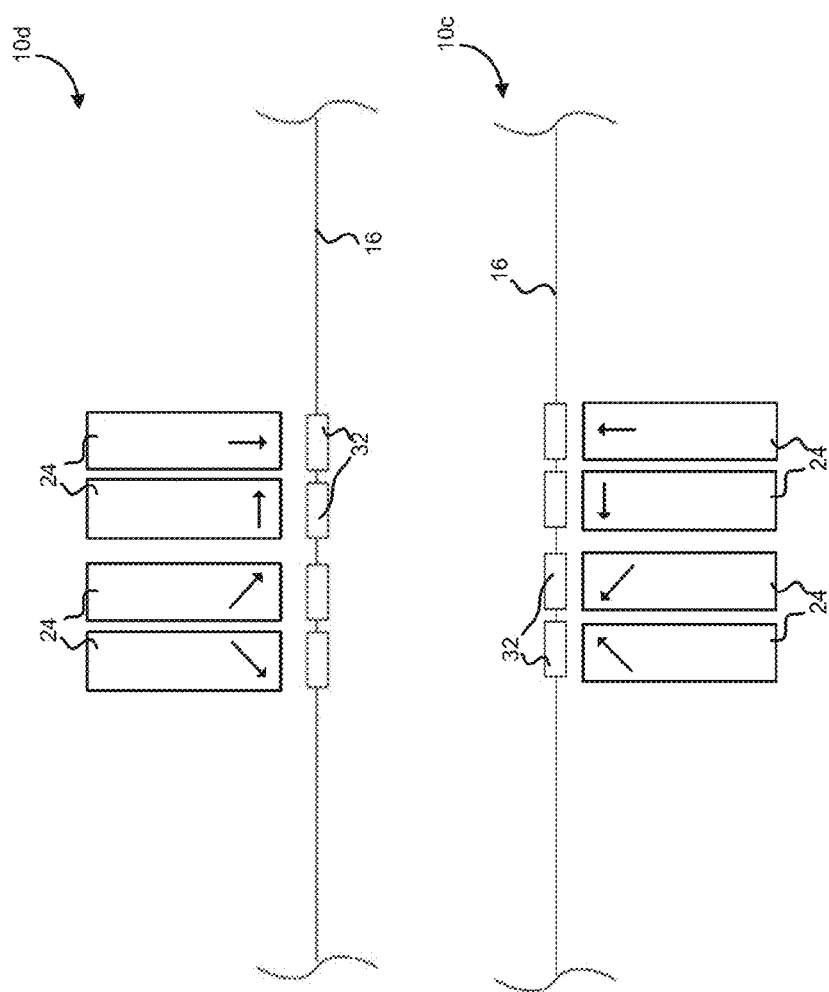

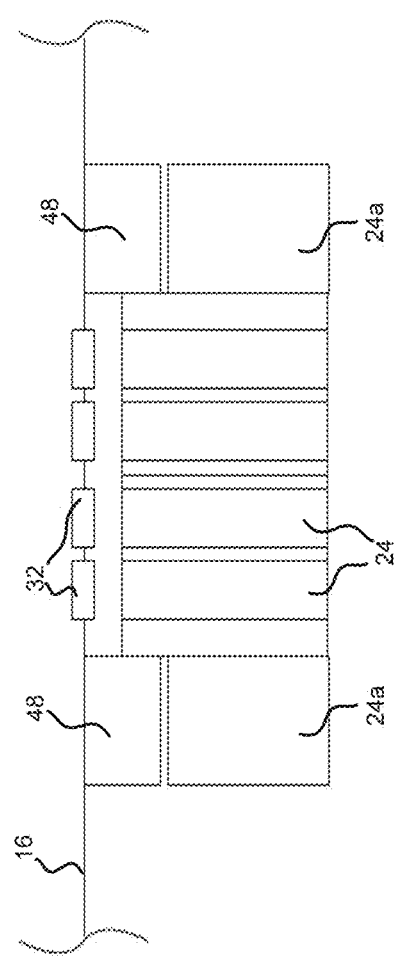

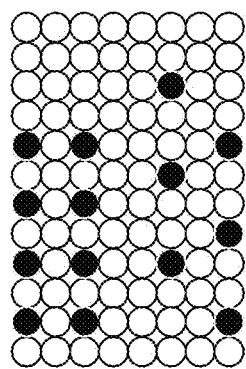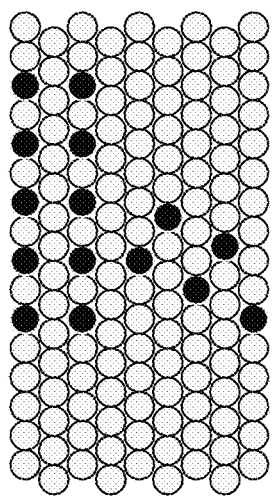
FIG. 26

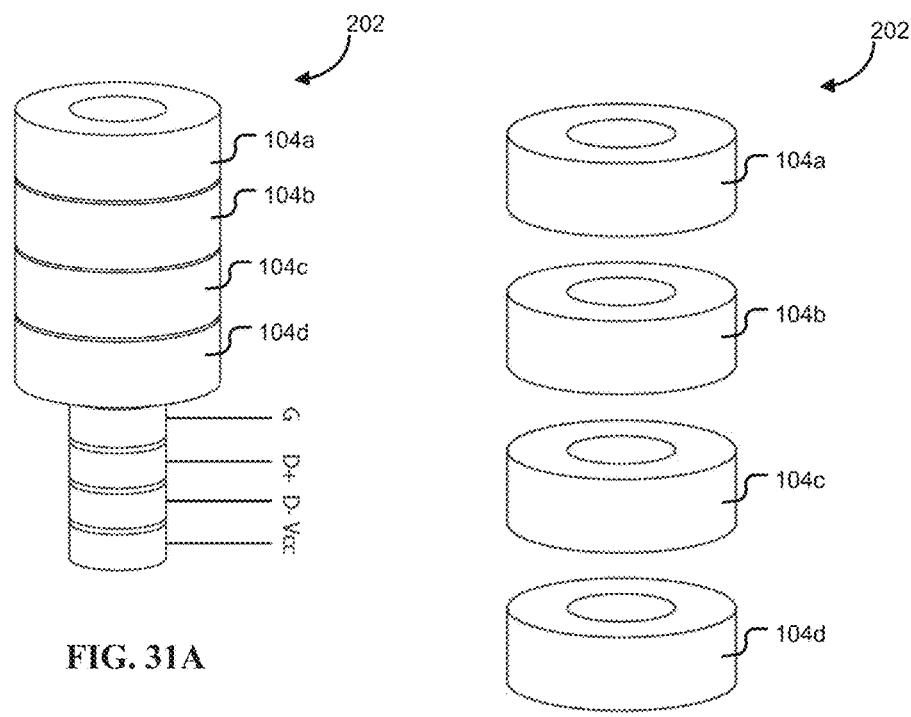
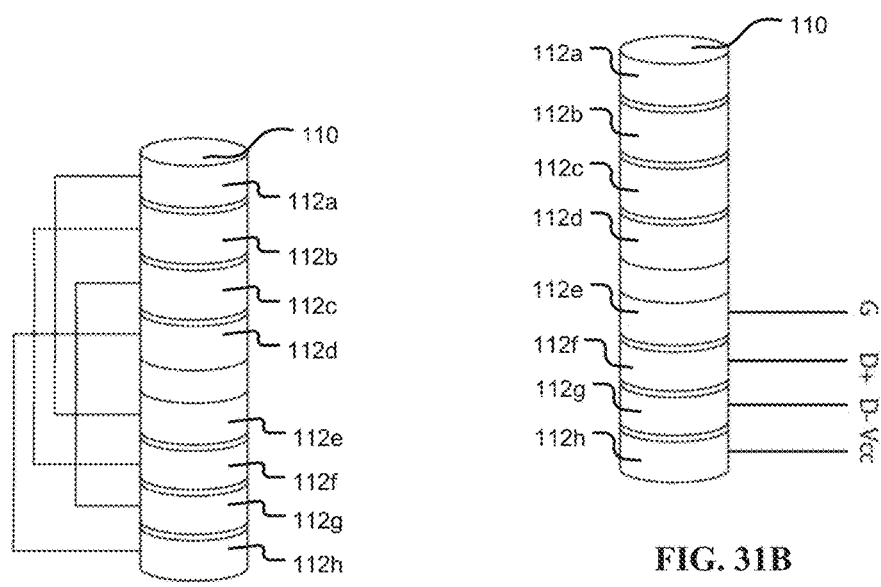
FIG. 31A
FIG. 31B
FIG. 31C

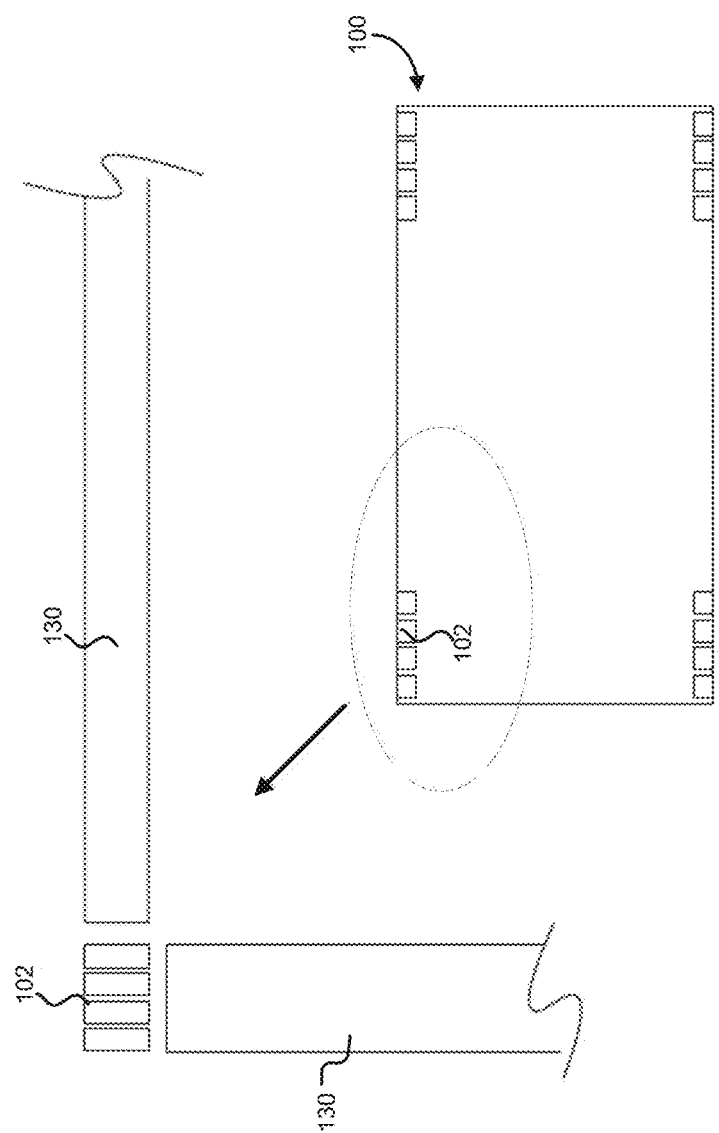

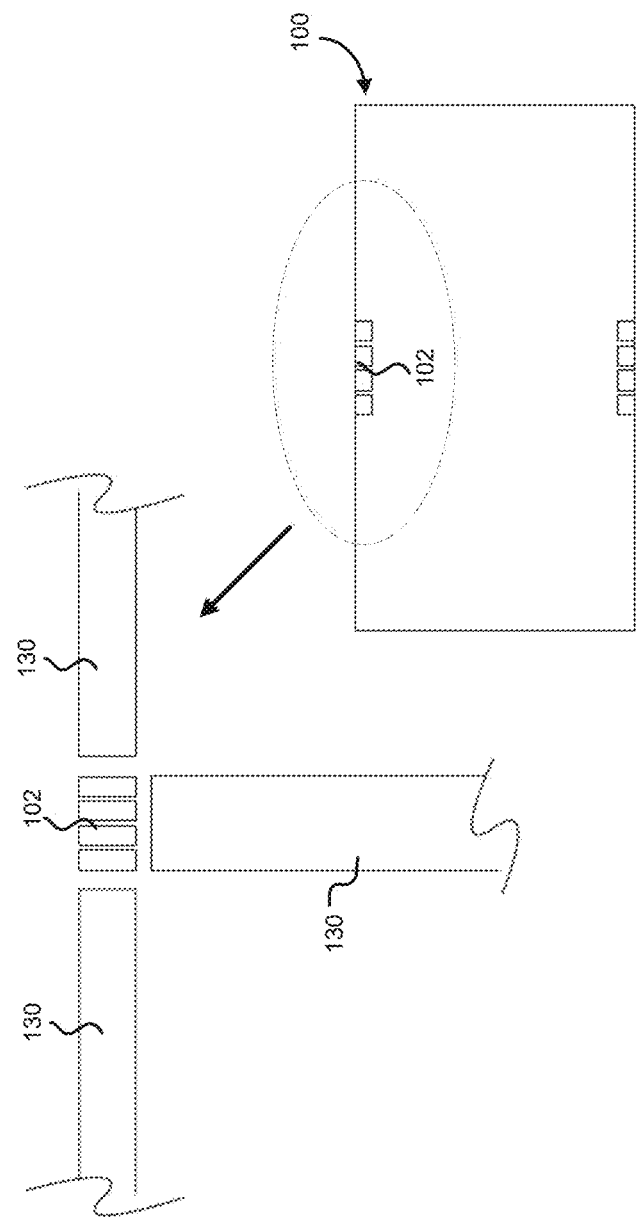

Section A-A

Section B-B

Section B-B

Section C-C

Section C-C

METHODS AND APPARATUS FOR MAGNETICALLY CONNECTING ELECTRONIC DEVICES AT A PLURALITY OF SURFACES

CROSS-REFERENCE TO RELATED APPLICATIONS

This is a continuation of PCT application no. PCT/CA2014/000803, filed on Nov. 12, 2014 and published as WO 2015/070321, and claims priority from U.S. provisional patent application Nos. 61/903,615 filed Nov. 13, 2013, 62/016,264 filed Jun. 24, 2014, 62/029,328 filed Jul. 25, 2014 and 62/032,955 filed Aug. 4, 2014, the entire contents of which are incorporated herein by reference.

FIELD

This disclosure relates to magnetic connectors for connecting devices to one another.

BACKGROUND

Mobile electronic devices (e.g. mobile phones, tablet computers, laptop computers, or the like) are usually provided with a plurality of connection options which allow the devices to communicate with one another electronically, or to supply energy to the internal battery to recharge the battery, or to add functionality to the device, such as connecting a peripheral device (e.g., keyboard, mouse, speakers, or the like).

Connection of devices mechanically and/or electrically integrates the multiple devices to provide complementary functions. To establish such connections it is necessary to orientate the devices relative to one another and to facilitate mechanical and/or electrical communication between the devices, e.g., by way of a contacts, ports, sockets, and other interfaces, which may be collectively referred to as connectors. The relative orientation of the devices is obtained through mechanical connections. It is desirable for these mechanical connections to be robust, simple to use, and aesthetically pleasing.

Electrical communication between the devices is typically provided either through wires or through wireless communications. Wires or cables are cumbersome to carry and increase the physicality of the devices. Provision must also be made on the device to permit connection of the cables to the device, which again presents aesthetic challenges to the design of the device. Wireless connections are less secure, with the possibility of eavesdropping on communications, require more energy and therefore consume more power from the battery and are subject to interference from external sources.

Therefore, it is desired to provide an improved connector that obviates or mitigates some or all of the above disadvantages.

SUMMARY

In an aspect, there is provided a connector including a magnet rotatable about at least one axis of the magnet. The magnet rotates to magnetically engage a magnet of another connector to form an electrical connection between the two magnets.

The electrical connection may comprise a data path.
The electrical connection may comprises a power path.

The connector may include a substantially enclosed cavity in which the magnet is rotatable.

The magnet may have a spherical shape.

The magnet may have a cylindrical shape.

The magnet may be a first magnet and the connector may include a plurality of magnets that includes the first magnet. The plurality of magnets may be arranged in a stack. Each of the plurality of magnets may have a cylindrical shape.

The connector may include an insulator disposed between at least two of the plurality of magnets, thereby allowing the at least two magnets to form separate electrical connections with the other connector.

Each of the plurality of magnets may have a hole extending therethrough such that a channel is defined through the stack, the channel for receiving an elongated electrical plug that forms an electrical connection with at least one of the plurality of magnets.

In another aspect, there is provided a device including a connector disclosed herein, the connector disposed at an edge of the device, for electrical connection with another device. The device is rotatable relative to the other device about an axis substantially parallel to the edge while maintaining the connection therebetween as a result of rotation of the magnet in the connector.

The device may be adapted to control the other device by way of the electrical connection.

In a further aspect, there is provided a connector including a cylindrical magnet to magnetically engage a magnet of another connector; and a sleeve wrapped around at least part of the magnet, the sleeve comprising a contact for forming an electrical connection with a contact on the other connector.

The sleeve may be a flexible flat cable.

The connector may include a cylindrical shim interposed between the sleeve and the at least part of the magnet.

In a yet further aspect, there is provided a connector for selective connection with other connectors. The connector includes a plurality of magnets disposed along a connecting surface of the connector; the plurality of magnets arranged to have a plurality of non-uniform magnetic orientations comprising: a magnetic orientation substantially parallel to the surface; and a magnetic orientation diagonal to the surface; such that the connector selectively connects to other connectors having magnets arranged with magnetic orientations matched to the plurality of magnetic orientations.

The plurality of magnetic orientations may be selected to encode an assigned key.

The plurality of magnetic orientations may be symmetrical.

The plurality of magnetic orientations may be asymmetrical.

The plurality of magnets may be arranged in a line.

The plurality of magnets may be arranged in a grid.

In yet another aspect, there is provided a connector for selective connection with other connectors. The connector includes a plurality of magnets disposed along a connecting surface of the connector, each of the plurality of magnets having a magnetic orientation; the plurality of magnets comprising at least one electromagnet having a magnetic orientation selected by a selecting a direction of current flow to the electromagnet; such that the connector selectively connects to other connectors having magnets arranged with magnetic orientations matched to the magnetic orientations of the plurality of magnets.

The connector may include a controller configured to receive a signal indicating a possible connection with another connector.

The signal may be received wirelessly.

The controller may be configured to activate the electromagnet to have a magnetic orientation selected to attract the other connector.

The controller may be configured to activate the electromagnet to have a magnetic orientation selected to repel the other connector.

In an even further aspect, there is provided a connector including a moveable magnet moveable between at least: an engaged position proximate a contacting surface of the connector, wherein the moveable magnet engages another connector to form a connection therewith; and a disengaged position recessed from a contacting surface, wherein the moveable magnet is disengaged from the other connector; wherein the moveable magnet is biased to the disengaged position, and is drawn to the engaged position by magnetic attraction between the moveable magnet and the other connector when the other connector is proximate.

The connection may include an electrical connection.

The connection may include a mechanical connection.

The moveable magnet may be biased to the disengaged position by a spring.

The connector may include a magnetic element disposed proximate the disengaged position, wherein the moveable magnet is biased to the disengaged position by magnetic attraction between the magnet and the magnetic element.

A density of flux lines between the magnet and the magnet element may increase when the moveable magnet moves towards the disengaged position.

The magnetic element may include a ferrous element.

The magnetic element may include a biasing magnet.

The connector may include a ferrous element disposed between the biasing magnet and the contacting surface to magnetically shield the contacting surface from the biasing magnet.

An electrical connection may be formed between the biasing magnet with the other connector through the ferrous element.

The moveable magnet may be a first moveable magnet and the connector may include a second moveable magnet, each of the moveable magnets moveable between at least: a respective engaged position proximate a contacting surface of the connector, wherein the moveable magnet engages another connector to form a connection therewith; and a respective position recessed from a contacting surface, wherein the moveable magnet is disengaged from the other connector; wherein each of the moveable magnets is biased to the respective disengaged position, and is drawn to the respective engaged position by magnetic attraction between the respective moveable magnet and the other connector when the other connector is proximate.

The connector may further include a first channel defining a path in which the first moveable magnet moves, and a second channel defining a path in which the second moveable magnet moves, and wherein each of the moveable magnet is biased to the respective disengaged position by convergence of the paths when the moveable magnets move towards the respective disengaged positions.

In another aspect, there is disclosed a method of operating electronic devices. The method includes providing at least two devices, each of the devices including a connector as disclosed herein, connecting the two devices by way of the respective connectors in a first mechanical configuration; and connecting the two devices by way of the respective connectors in a second mechanical configuration different from the first mechanical configuration.

BRIEF DESCRIPTION OF THE DRAWINGS

Embodiments of the invention will now be described by way of an example only with reference to the accompanying drawings in which:

FIGS. 2A, 2B, 2C, 2D, 2E, and 2F are schematic views showing locations of connectors on an electronic device, exemplary of embodiments;

FIG. 11 is view similar to FIG. 9, exemplary of an embodiment;

FIG. 12 is a schematic view of a selectively configurable connector, exemplary of an embodiment;

FIG. 21 is a view of a connector with key encoding, exemplary of an embodiment;

FIG. 22 is a view of a connector with a biasing magnet and a ferrous block, exemplary of an embodiment;

FIG. 26 is a schematic view showing selectively activated connectors, exemplary of embodiments;

FIGS. 29A, 28B, and 29C are views of a computing device including connectors, exemplary of an embodiment;

FIG. 31A is a side view of a connector of the device of FIG. 28, exemplary of an embodiment;

FIG. 31B is an exploded side view of the connector of FIG. 31A, exemplary of an embodiment;

FIG. 31C is a schematic view of a plug of the connector of FIG. 31A, exemplary of an embodiment;

FIGS. 41A and 41B are views of a computing device having ferrous strips, exemplary of an embodiment;

DETAILED DESCRIPTION

Figure 1A:
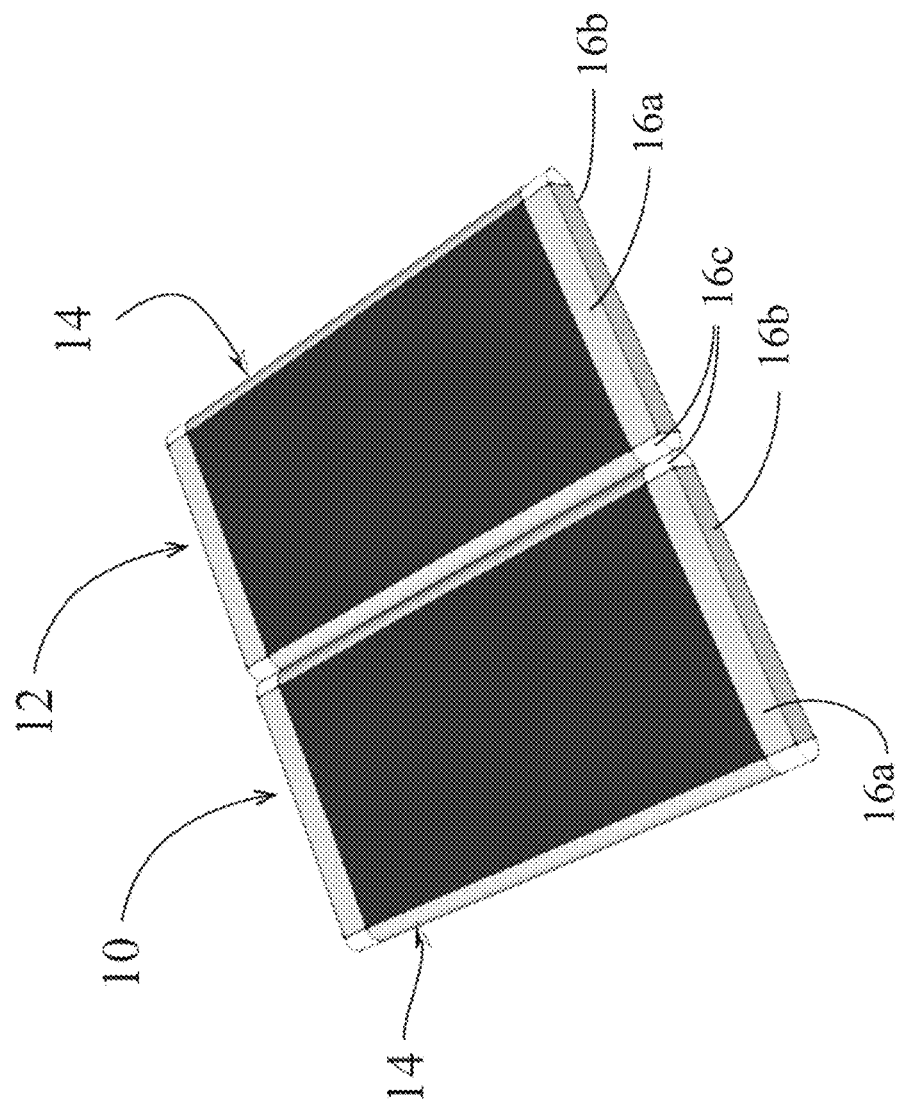
FIGS. 1A, 1B, and 1C are perspective views of a pair of electronic devices, in three respective configurations, exemplary of an embodiment.
Figure 1B:
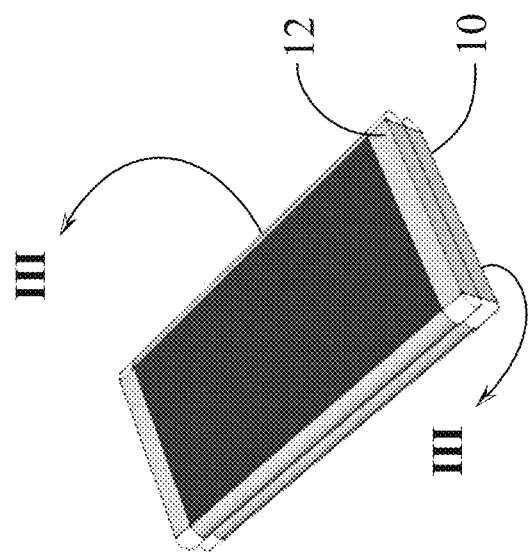
Figure 1C:
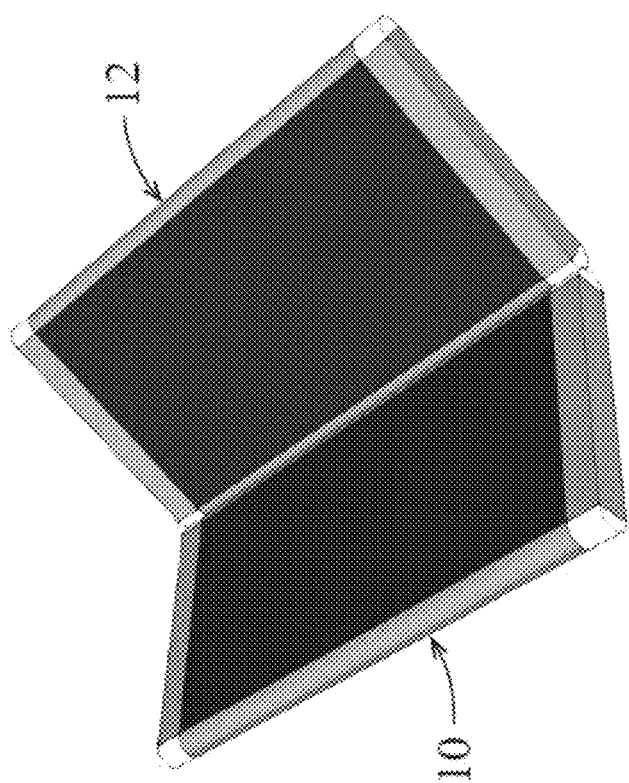

Referring now to FIGS. 1A, 1B and 1C, a pair of electronic devices 10, 12 each include a housing 14 defined by contiguous external surfaces 16. Front, end, side and rear surfaces are indicated as 16a, 16b and 16c, 16d respectively (rear surface 16d is shown in FIG. 11). The devices 10, 12 may be any electronic devices that interface with one another and provide complementary functions. For example, each device may be a smartphone, or one may be smartphone and the other a speaker. As further examples, one of the devices may be a smartphone and the other a viewing screen, or both may be viewing screens, or one may be a screen and the other a keyboard; one device may be a touchscreen enabled device and the other a router to communicate to the Internet, or one may be a camera and the other a smart phone to store images from the camera. It will be apparent that the exact function of the devices is not significant and many mutually complementary devices exist that benefit from interconnection and interoperation.

As shown in FIG. 1A, the devices 10, 12 may be arranged side by side with a pair of surfaces 16 juxtaposed, typically when in use, or, as shown in FIG. 1B, in a stacked configuration with a different pair of surfaces juxtaposed for storage or for alternative functions.

Figure 3:
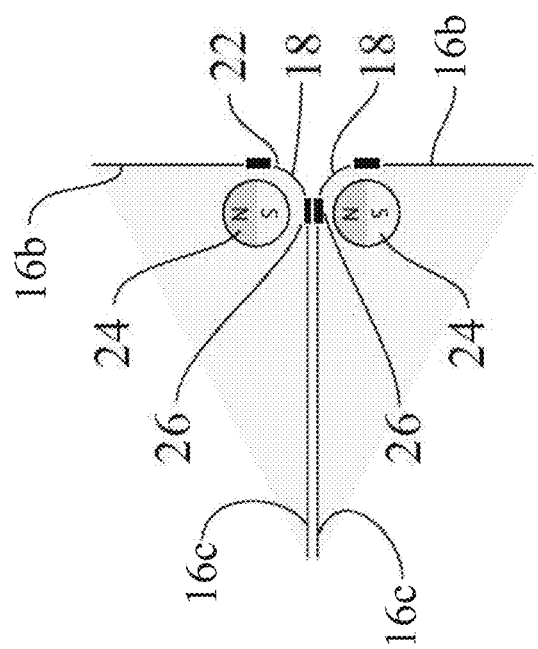
FIG. 3 is a side view of a portion of the two devices of FIG. 1B, from a view III.

As may be seen from FIG. 3, each of the devices 10, 12 has pairs of surfaces 16 that merge smoothly at corners 18 over a relatively small radius, indicated at 22, to define the edges of the devices 10, 12.

Devices 10, 12 include connectors at corners 18. In particular, each connector includes a spherical magnet 24 that is supported in each of the devices 10, 12 at the corners 18. The magnets 24 are mounted for rotation about three orthogonal axes, for example, by being rotatably located within a substantially enclosed cavity (e.g., a cage, which may be formed of electrically-insulative materials such as plastic, or electrically-conductive materials as required). The magnets 24 are formed with a pair of hemispherical poles such that one half of the sphere is a north pole and the other a south. Such magnets may be made from rare earth materials, such as Neodymium-Iron-Boron, as are generally available. In other embodiments, a magnet 24 may be shaped or mounted for rotation about fewer axes of the magnet (e.g., about one or two axes of the magnet).

Indicator discs 26 are incorporated into the surfaces 16 to provide an indication of the location of the magnet 24. The discs 26 may be conveniently made from a magnetically transparent material, such as aluminum or copper that also enhances the aesthetics of the casing.

As can be seen in FIG. 3, with the devices 10, 12 in the position of FIG. 1B, one of the indicator discs 26 on one device 10 is positioned over the indicator 26 of the other device. In this position, the magnets 24 are adjacent one another so that one or more of the magnets 24 rotate to magnetically engage one another. In particular, one or more of the magnets 24 may rotate to be oriented such that the north and south poles of adjacent magnets are aligned. As further detailed below, in some embodiments, once the magnets 24 are engaged, an electrical connection may be formed through the magnets 24 for provide data and/or power paths. In an embodiment, the electrical connection may be formed through contacts disposed on housings 14, the contacts being in electrical communication with respective magnets 24. In another embodiment, the magnets 24 may protrude through respective housing 14 such that they contact each other directly.

A significant magnetic force is applied between the components to retain the components in the desired configuration. The rotational support of the magnet 24 ensures that it is free to rotate under the magnetic forces present from the adjacent magnet and thereby provide the requisite magnetic field strength to retain the components in that configuration.

Figure 4:
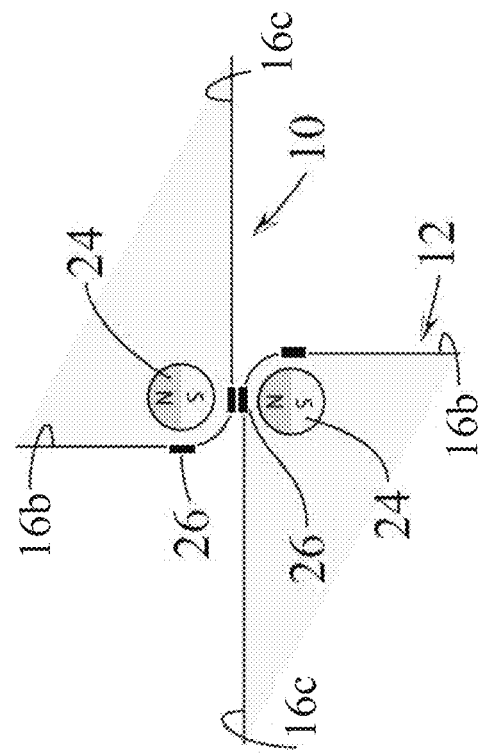
FIG. 4 is a side view of a portion of the two devices of FIG. 1B, in an alternative configuration, exemplary of an embodiment.
Figure 10:
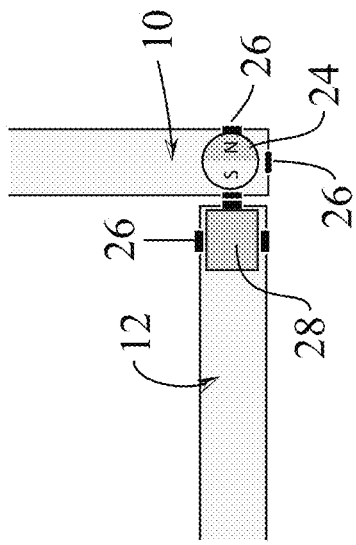
FIG. 10 is a view similar to FIG. 8, exemplary of an embodiment.

As can be seen in FIG. 4, the devices 10, 12 may be reoriented such that the corners 18 abut. In this position, the indicator discs 26 are again aligned and the magnets 24 similarly self-aligned to provide maximum attractive force. The reorientation may be achieved by physical separation of the devices 10, 12 and repositioning, or may use the curved corners 18 at the intersection of the surfaces 16 to establish a hinged connection. The hinged connection allows, for example, the devices to be rotated relative to one another about an axis that is substantially parallel to the adjacent edges of the devices. As the devices 10, 12 are adjusted relative to one another, each of the magnets 24 rotate within their housing to maintain alignment and retain a connection between the two devices. Adjustment over a range of movement can thus be achieved without separation of the devices and while maintaining the connection between the devices, as indicated in FIG. 10.

Figure 5:
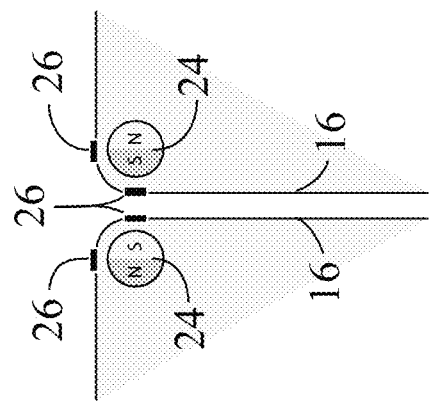
FIG. 5 is a side view of a portion of the two devices of FIG. 1B, in a further configuration, exemplary of an embodiment.

If the configuration of the devices 10, 12 is to be changed such that they lie side-by-side, so that two different surfaces 16 abut, as illustrated in FIG. 5, the poles of the magnets 24 would not initially be aligned with the abutting indicator discs 26. However, the magnetic field strength between the two adjacent magnets 24 is such that the each of magnets is rotated through 90° from the position shown in FIG. 3 to bring a north pole into alignment with a south pole and ensure the necessary connection.

In the above embodiment, the magnet 24 is spherical allowing it to rotate about three mutually perpendicular axes. The magnet 24 may alternatively be cylindrical so as to be rotatable about a single axis and allow orientation of each of the magnets to adjacent devices.

Figure 6:
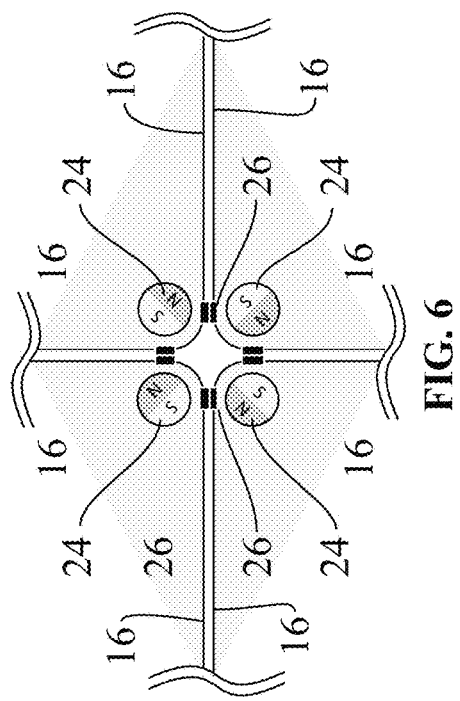
FIG. 6 is a view showing multiple interconnected devices, exemplary of an embodiment.

The connection is not limited to a pair of devices. In the embodiment of FIG. 6, four devices are positioned such that the indicator discs 26 of one abuts the indicator discs 26 of two other devices 10, 12. In this arrangement, the spherical magnets 24 orientate themselves so as to be at 45° to the two surfaces 16, but still provide a strong magnetic coupling between the north pole in one magnet and the adjacent south pole in the adjacent magnet. An equilibrium position will be found in which the magnetic forces are balanced and the components retained.

Figure 7:
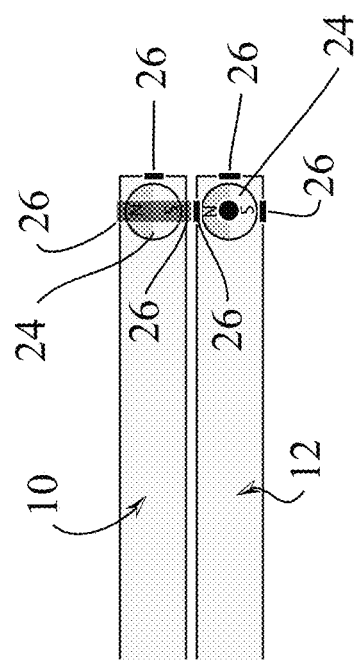
FIG. 7 is a view showing stacking of devices, exemplary of an embodiment.
Figure 8:
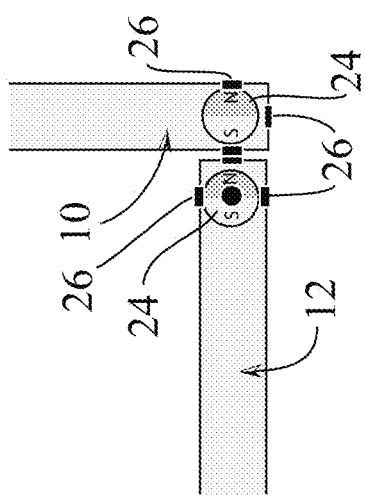
FIG. 8 is a view showing the devices of FIG. 7 in an alternative configuration, exemplary of an embodiment.

The connection provided by the magnet 24 may also be incorporated into other form factors of the devices 10, 12. As illustrated in FIGS. 7 and 8, the devices 10, 12 are relatively thin with a spherical magnet 24 located adjacent one edge 16. An indicator disc 26 is located on the three adjacent surfaces and, when the components 10, 12 are stacked, one above the other, as shown in FIG. 7, the magnets 24 are aligned so that the north pole of one magnet is adjacent to the south pole of the adjacent magnet. The device 12 may also be positioned on the end face of the device 10 such that it is at right angles to the device 12. In that configuration, as shown in FIG. 8, the indicator 26 on the end face of the device 12, abuts the indicator 26 on one surface of the device 10 and the magnets 24 realign so that the opposite poles are adjacent one another. Again, the devices 10, 12 are held securely to one another in the revised configuration.

Figure 9:
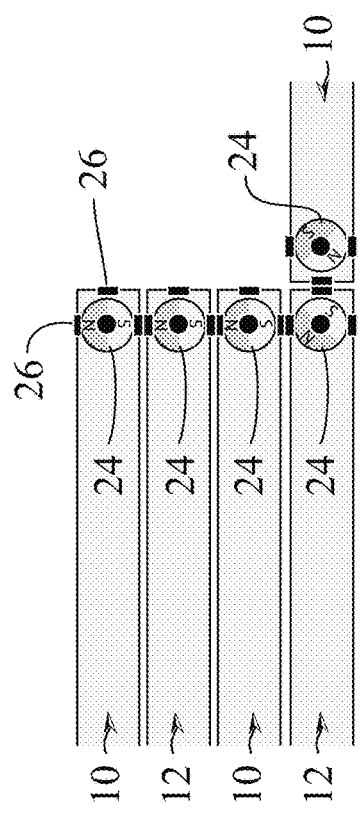
FIG. 9 is a view showing multiple interconnected devices, exemplary of an embodiment.

With the arrangement of FIG. 7, it will be appreciated that additional components can be stacked one above the other, as indicated in FIG. 9. In each case the magnets orientate themselves to provide dissimilar poles.

It is also possible, as shown in FIG. 10, to incorporate a passive magnetic material 28 into one of the devices 10, rather than an active magnet. In this configuration, the active magnet 24 in the component 12 will interact with the magnetic material in the component 10 and provide a stable connection between the two devices in one the three possible positions. The magnet 24 will align with either pole adjacent to the magnetic material 28. It will be appreciated however that the use of the passive magnetic material in place of the active magnet reduces the number of configurations that can be attained. In some embodiments, the active magnet 28 may form an electrical collection with the passive magnetic material 28.

As shown in FIG. 11, where the devices 10, 12 have an increased thickness, a pair of magnets 24 may be incorporated, one at each corner 18, and again adjacent components can be connected through the interaction of adjacent magnets in the two devices. Where one device 10 needs to be aligned with the other 12 in side-to-side relationship, as indicated in ghosted outline, the magnets 24 will again align to provide a magnetic connection between the two devices.

For enhanced flexibility, it will be appreciated that a magnet at each corner of the housing 14 is preferred. However, in different devices, it may not be necessary to provide a magnet in each corner, but rather distribute the magnets about the housing at convenient locations. FIG. 2 illustrates, non-exhaustively, a variety of possible locations. Thus, the magnet 24 may be located centrally, as shown in FIG. 2A, inset from each corner 18 as shown in FIG. 2B or at the corners 18 as described above and shown in FIG. 2C. It is also possible to arrange the magnets 24 so that only a preferred orientation is available, for example by arranging the magnets 24 at the apexes of a triangle as shown in FIG. 2D, or only selected areas of the housing 14 as shown in FIG. 2F. A flexible orientation can be provided by arranging the magnets 24 along a major axis of the housing 14 as shown in FIG. 2E so that the connection is attained in either of two positions.

As noted above, in some embodiments, the magnets may be utilized to connect the devices both mechanically and electrically.

So, referring to FIG. 12, a pair of devices, 10a, 12a include connectors, each having an array 30 of electrical connections. As detailed below, the connectors are adapted for selective connection with other connectors.

As shown, the array 30 has a plurality of electrical terminals 32 embedded in the surface. Each terminal 32 is connected through electrical leads 34 within the device 10a, 12a to a controller 36. The controller 36 determines the functional connections of the device to each of the terminals 32. An electromagnet 38 is located adjacent to each of the terminals 32 and is selectively energized by a magnetic coupling controller 40. The current flow to the electromagnet 38 is bidirectional so that the electromagnet 38 may attain either a north or south pole adjacent to the associated terminal 32. Thus, the magnetic orientations of the electromagnets 38 may be selected by a direction of current flow to each of the electromagnets 38. The connector selectively connects to other connectors having magnets arranged with magnetic orientations matched to the magnetic orientations of the electromagnets 38.

The opposite array 30 has a permanent magnet 24 associated with each of the terminals 32. The magnet 24 is displaceable within the housing 14 so as to move toward or away from the contacting surface 16. The magnets 24 are preferably biased away from the surface 16 by a light spring, or similar device, so as to be normally in a retracted position. The terminals 32 may similarly be biased away from the deployed position or may be affixed to the magnet 24 so as to move with the magnet. Full displacement of the terminal 32 may not be required to inhibit electrical contact and simple preloaded flexure away from the contact may be sufficient, with the flexure overcome by the action of the magnet 24. Where the controller 36 controls the internal connections in the device 10b, the terminal 32 may remain fixed, as shown in FIG. 12.

Upon connection of the device 10a to the device 12a, the terminals 32 are brought into alignment. The device 10a recognizes the nature of the device 12a and a possible connection therewith, typically through a near field communication protocol or another type of wireless signal, and conditions the controller 36 to establish the requisite connections to the appropriate one of the terminals 32. The magnetic coupling controller 40 is similarly conditioned to activate selected ones of the electromagnets 38. Those electromagnets that are activated generate a magnetic field that attracts the associated magnet 24 and establishes a physical and electrical connection between the terminals 32 of the abutting arrays 30. In this way, the controller 40 may activate the electromagnets 38 to have a magnetic orientation selected to attract another connector. Conversely, the controller 40 may activate the electromagnets 38 to have a magnetic orientation selected to repel another connector.

Where a connection is not required, the electromagnet 38 is not energized and the magnetic force is insufficient to overcome the bias of the magnet 24 to the retracted position.

As the nature of the devices 10, 12 change, the controllers 36, 40 may adjust both the connections within the device and the selectively energizable magnetic coupling to provide a selective electrical connection between the two devices. In the event that the devices should not be connected to one another, the electromagnets 38 may be energized so as to repel the permanent magnets and thereby ensure that any electrical connection is not established.

The selective operation of the electrical connection may also be utilized to ensure that the connection is authorized by the device 10a. Activation of the electromagnetic through the magnetic coupling controller 40 can be in itself controlled through a password or encryption protocol that requires authentication of the device 12a before the connections are made. In this way, access to sensitive information on the device 10a can be inhibited.

Figure 13:
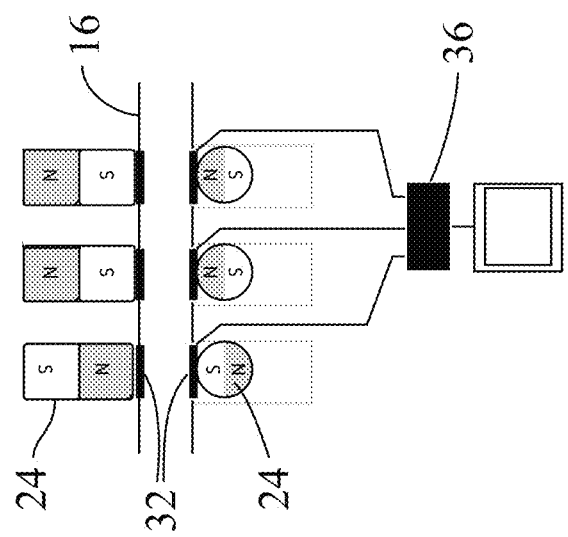
FIG. 13 is view similar to FIG. 12, exemplary of an embodiment.

A similar arrangement can be provided using arrays of permanent magnets 24 as shown in FIG. 13. In the arrangement shown in FIG. 13, permanent magnets 24 are installed in the device 10a and moveable spherical permanent magnets 24 installed in the device 12a. When the devices 10a, 12a are brought into contact, the spherical magnets 24 orientate themselves so that the plurality of the magnets 24 in the device 10a establish both a mechanical and electrical connection. The controller 36 determines the functional nature of the connection established by each magnet 24.

Figure 14:
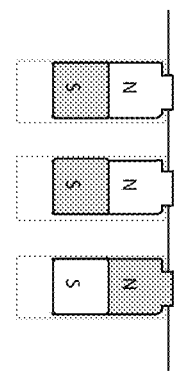
FIG. 14 is a view similar to FIG. 12, exemplary of an embodiment.

In the above embodiments, the terminals 32 are indicated as separate from the magnet 24 but, as shown in FIG. 14, those magnets 24 may provide both a force of attraction and as the electrical connection. The end face of each of the permanent magnets 24 is formed so that it protrudes slightly from the casing 14 and thereby establishes an electrical connection with an adjacent array 30 of magnets 24.

Figure 15:
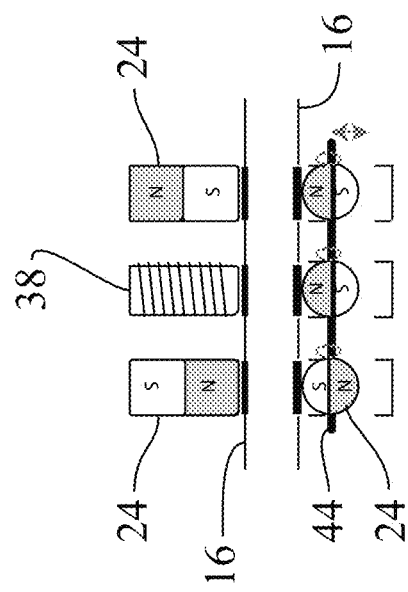
FIG. 15 is a view similar to FIG. 12 with magnets in an engaged state, exemplary of an embodiment.
Figure 16:
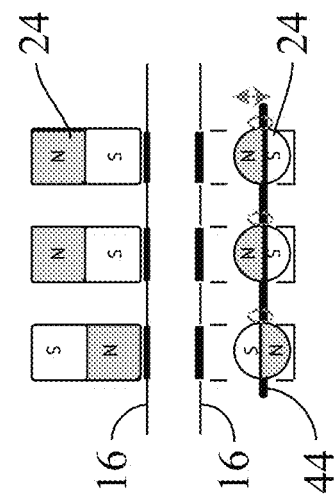
FIG. 16 a view of the connectors of FIG. 15, with the magnets in an disengaged state, exemplary of an embodiment.

The form of actuation of the magnets 24 may be combined as shown in FIG. 15, in which the array 30 associated with the device 10a includes a pair of permanent magnets 24 and an electromagnet 38. The array 30 associated with the device 12a are ganged on a common spindle 44 and may be moved toward and away from the surface of the casing of the device 12a. The spindle 44 is moveable away from the face of the casing 16 to bodily move each of the magnets 24. Movement of the magnets 24 may also be attained by rotating the axle 44 so that like poles are adjacent and thereby use the magnetic forces of repulsion to separate the magnets and disconnect the components 10a, 12a.

The permanent magnets 24 have been illustrated as a bar magnet presenting one pole to the terminal 32. This magnetic orientation may be referred to herein as an "up" orientation, i.e., when the north pole is proximate terminal 32, or as a "down" orientation, i.e., when the south pole is proximate terminal 32. In each case, the magnetic orientation may be substantially perpendicular to a connecting surface (e.g., surface of terminals 32).

Figure 17:
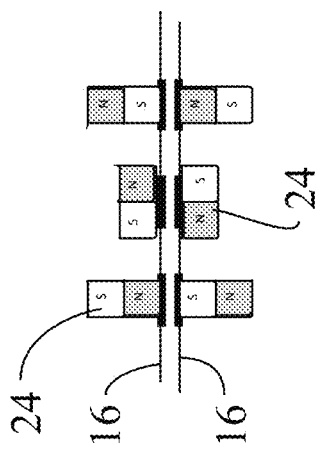
FIG. 17 is schematic view of a connector, exemplary of an embodiment.

However, as shown in FIG. 17, the permanent magnets may present both north and south poles to the terminal 32 and align with complimentary pairs of poles in the adjacent terminal. This magnetic orientation may be referred to herein as a "left" orientation, i.e., when the north pole is to the left of the south pole, or as a "right" orientation, i.e., when the north pole is to the right of the south pole. In each case, the magnetic orientation may be substantially parallel to a connecting surface (e.g., surface of terminals 32).

Figure 18:
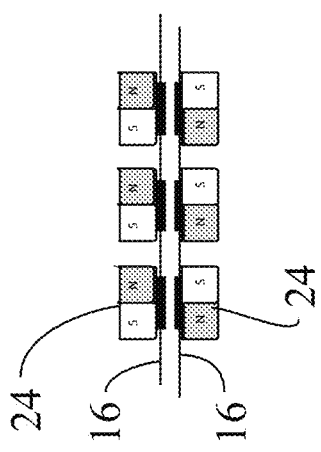
FIG. 18 is view similar to FIG. 17, exemplary of an embodiment.

Of course, as shown in FIG. 18, such magnets may be combined with polar magnets in the same array.

Figure 19A:
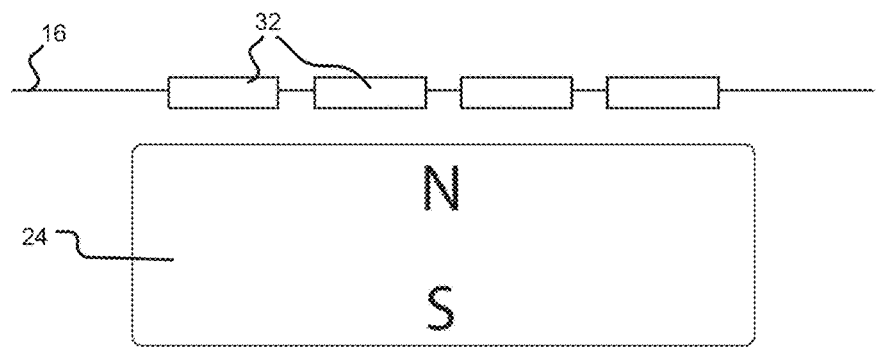
FIGS. 19A-19B are views of connectors having a single large magnet, exemplary of embodiments.
Figure 19B:
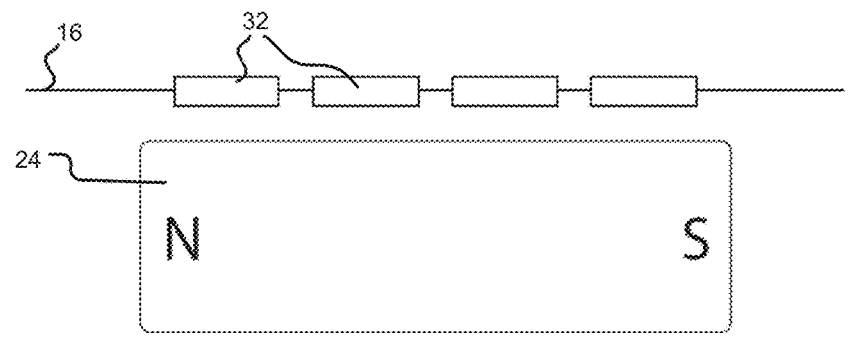

Other arrangements can be provided using a large magnet 24, as shown in FIGS. 19A and 19B. As shown, a large magnet 24 may span several terminals 32. In an arrangement shown in FIG. 19A, the magnet 24 may present one pole to each terminal 32. Compared to an array of smaller magnets, this arrangement provides a stronger attractive/repulsive force in directions perpendicular to surface 16.

In an alternate arrangement shown in FIG. 19B, the magnet 24 may present both north and south poles to terminals 32 and align with a complimentary pair of poles in adjacent terminals of another device.

Compared to an array of smaller magnets, this arrangement facilitates alignment of devices, and inhibits lateral slipping of the devices. Lateral stability is thus improved.

Figure 20A:
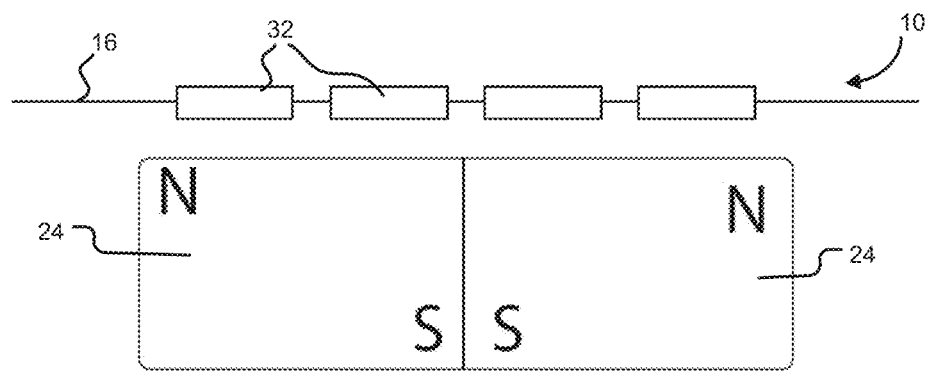
FIGS. 20A, 20B, 20C and 20D are views of a connector having multiple magnets, exemplary of embodiments.
Figure 20B:
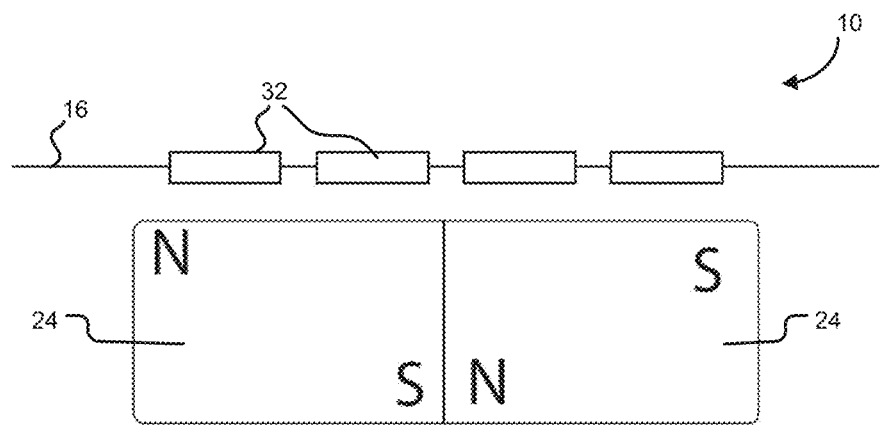
Figure 20C:
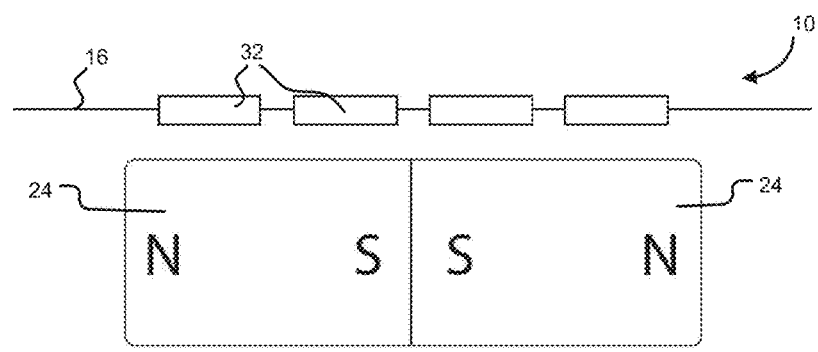

Yet other arrangements can be provided using a pair of magnets 24, as shown in FIGS. 20A, 20B, and 20C. The arrangements of FIGS. 20A and 20B provide a balance between (i) attractive/repulsive strength in directions perpendicular to surface 16 and (ii) lateral stability. The arrangement of FIG. 20A is symmetrical (i.e., with reflect to a center point of the connector), and thus may be used to provide a connector suitable for use in two orientations. In contrast, the arrangement of FIG. 20B is asymmetrical, and thus may be used to provide a connector suitable for use in only one orientation. The arrangement of FIG. 20C, like the arrangement of FIG. 19B also provides improved lateral stability, but being symmetrical may be used to provide a connector suitable for use in two orientations.

Figure 20D:
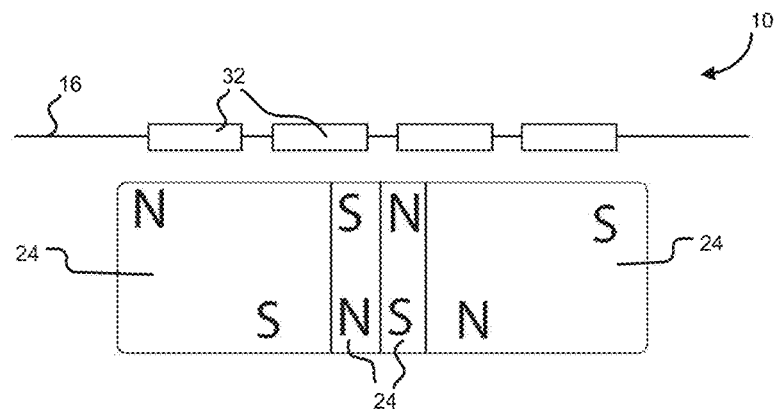

FIG. 20D shows an arrangement of four magnets that provides a balance between (i) attractive/repulsive strength in directions perpendicular to surface 16 and (ii) lateral stability. Other arrangements that provide a similar balance are possible, as will be apparent to those of ordinary skill in the art.

Any of the magnets shown in FIGS. 19A and 19B and FIGS. 20A, 20B, 20C, and 20D may be a permanent magnet or an electromagnet.

An array of magnets 24 may be provided with respective orientations selected to encode a key assigned to the device, or assigned to a connector. For example, as shown in FIG. 21, device 10c includes an array of four magnets having non-uniform magnetic orientations encoding an assigned key, namely, diagonally-up-right, diagonally-up-left, left, up. Each orientation may be selected from a set of possible orientations (e.g., up, down, diagonally-up-left, diagonally-up-right, diagonally-down-left, diagonally-down-right, left, right, etc.), allowing a large number of unique keys to be encoded.

Device 10c may be connected to a device having an array of magnets encoding a complementary key, such as device 10d, but will exert an repulsive force on devices having one or more magnets that do not encode the complementary key. In this way, undesirable connections to device 10c may be excluded.

FIG. 22 shows an arrangement including a magnet 24 that are disposed in channels extending away from each electrical terminal 32, two side magnets 24a and ferrous blocks 48. Each magnet 24 is moveable within a path defined by its channel to toggle between a disengaged state and an engaged state. In particular, each side magnet 24a may attract an adjacent magnet 24 to bias the magnet 24 to a disengaged state, i.e., away from electrical terminals 32. The magnet 24 may further attract its neighbouring magnets 24 to collectively bias the magnets 24 to the disengaged state. So, each side magnet 24a may be referred to as a "biasing" magnet. Upon alignment with an adjacent array of permanent magnets, the magnetic forces between side magnets 24a and adjacent magnets 24 are overcome to allow the magnets 24 to move into an engaged statement, i.e., into engagement with the opposite terminal.

Conveniently, when magnets 24 are in the disengaged state, magnetic flux lines at the contacting surface 16 may be significantly reduced.

Like passive stop 46 (FIG. 23), side magnets 24a are magnetic elements adapted to bias a magnet 24 to a disengaged (retracted) state. In other embodiments, other types of magnetic elements may be used.

When the moveable magnet moves towards the disengaged position, a density of flux lines between the magnet element and a magnet 24 increases.

Each ferrous block 48 inhibits the attractive/repulsive force of adjacent magnet 24a, and thereby provide a magnetic shield between the magnet 24a and the contacting surface. For example, opposing poles of two magnets may be connected together when a ferrous block 48 is interposed therebetween. Each ferrous block 48 also provides an electrical connection, which may be used in conjunction with the electrical connections provided by electrical terminals 32.

Figure 23:
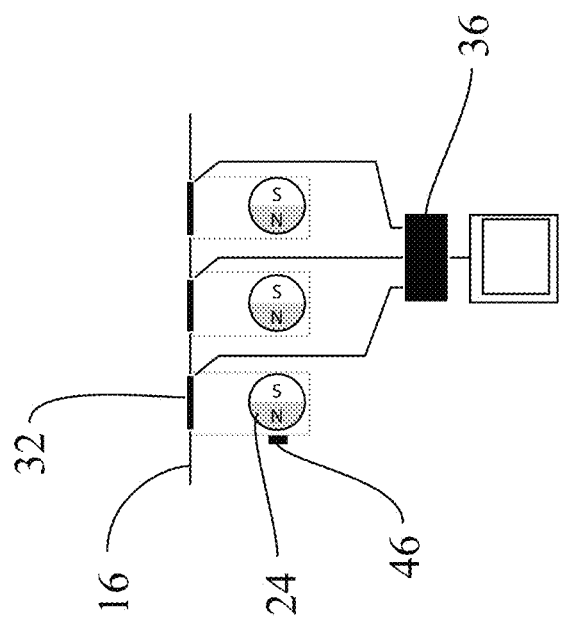
FIG. 23 is a schematic view of a connector having engaged and disengaged states, exemplary of an embodiment.
Figure 24:
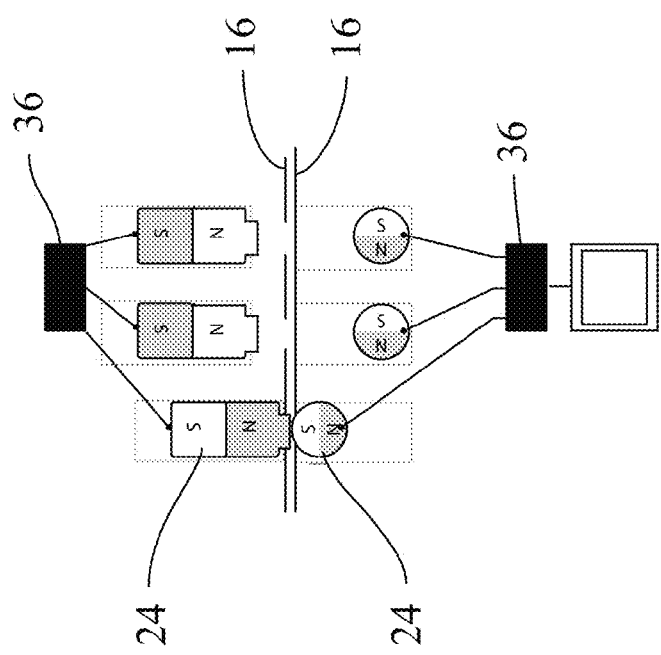
FIG. 24 is a schematic view of a connector having engaged and disengaged states, exemplary of an embodiment.

As shown in FIG. 23, to avoid the use of additional mechanical devices, the magnets 24 may be held in the disengaged or at rest state by a passive stop indicated at 46. The stop is a ferrous material, which attracts the permanent magnet 24 to be held away from the casing 16. Upon alignment with an adjacent array of permanent magnets, as shown in FIG. 24, the magnetic forces on the stop 46 are overcome to allow the permanent magnets 24 to move into engagement with the opposite terminal.

Figure 25C:
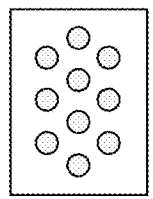
FIGS. 25A, 25B, and 25C are schematic views showing arrays of connectors, exemplary of embodiments.
Figure 25B:
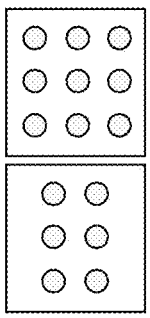
Figure 25A:
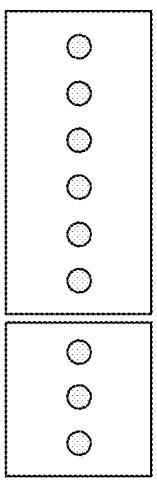

As described above, the arrays 30 are shown as linear array of magnets. Alternative orientations of terminals 32 may be implemented for the array as shown in FIG. 21. The inline orientation shown in FIG. 25A may vary in the number of terminals 32 to suite particular applications. The controller 36 controls the functional association of the terminal with the device so that the number of active terminals is optimized. Alternatively, as shown in FIG. 25B, the terminals 32 may be arranged in a cubic orientation or, as shown in 21c, in a hexagonal orientation. Selective energisation of those terminals facilitates connection and disconnection. As illustrated schematically in FIG. 26, the selective activation in a large array allows for a large variety of connections to be established to suite individual components whilst retaining a connection between the components.

Figure 28:
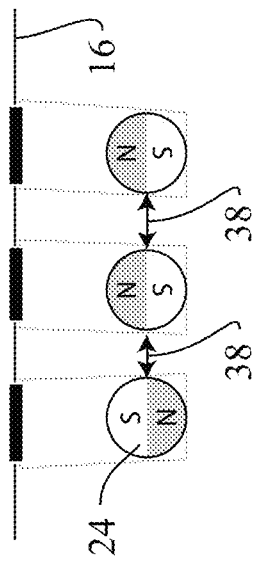
FIG. 28 is a schematic view of a connector with magnets in a disengaged state, exemplary of an embodiment.
Figure 27:
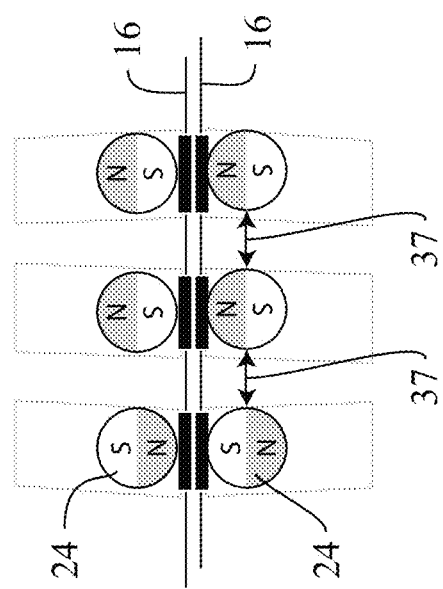
FIG. 27 is a schematic view of a connector with magnets in an engaged state, exemplary of an embodiment.

As described above, biasing of the magnets to a retracted position is provided by a mechanical biasing element, such as a spring. However, the inherent forces of attraction between the magnets 24 may be used to bias the magnets 24 to a retracted position, either with use of the stop 46 or independently. As shown in FIGS. 27 and 28, the magnets may be mounted so as to be moveable along channels defining divergent paths, from retracted to deployed positions (or conversely, along channels defining convergent paths, from deployed to retracted positions). When deployed, the spacing between the magnets 24, indicated at 37 is greater than when retracted, as indicated at 38. Upon release of the devices 10, 12, the magnets will be attracted to one another and move to a retracted position at which the spacing is minimal. The provision of a passive stop 46 for one of the magnets 24 reinforces the bias to the retracted position. Again, when the magnet 25 is in its retracted position, magnetic flux lines at the contacting surface 16 may be significantly reduced.

Figure 29A:
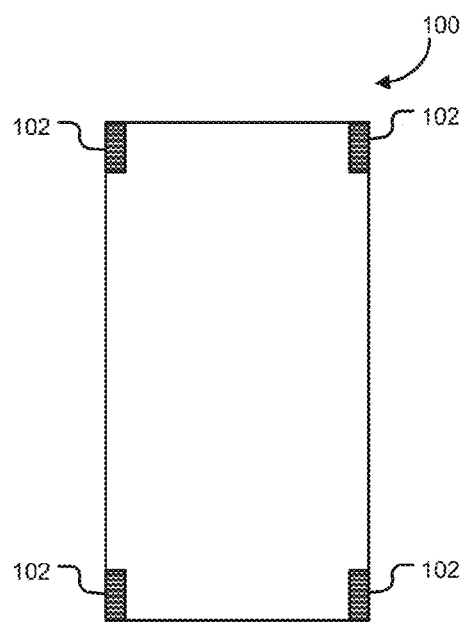
Figure 29B:
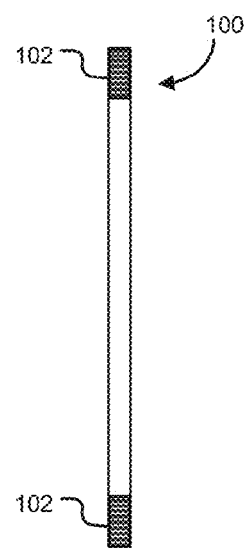
Figure 29C:
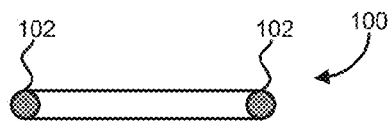

FIG. 29A is a front elevation view of a computing device 100; FIG. 29B is a left/right side elevation of device 100; and FIG. 29C is a top/bottom plan view of device 100. As detailed below, computing device 100 may be any type computing device such as, for example, a smart phone, a tablet computer, a laptop computer, a desktop computer, etc.

As shown, device 100 includes a connector 102 at each of its four corners. Connectors 102 are substantially similar to the connectors described above. Each connector 102 is adapted to mate with another connector 102 of another device. When mated, connectors 102 allow two devices to connect both mechanically and electrically. Connectors 102, individually and collectively, allow device 100 to establish power and data paths to connected devices.

Figure 30A:
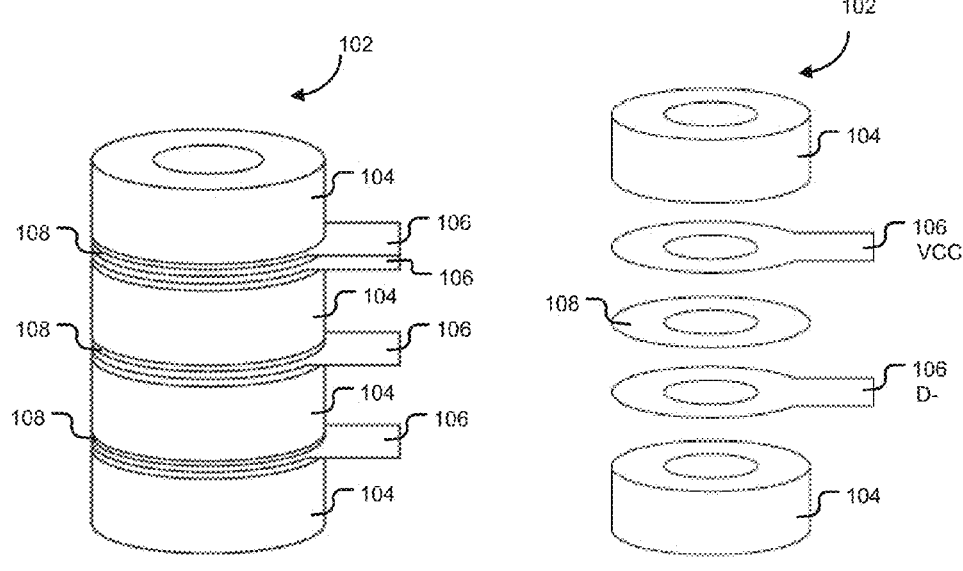
FIG. 30A is side view of one of the connector of FIG. 29, exemplary of an embodiment.
Figure 30B:
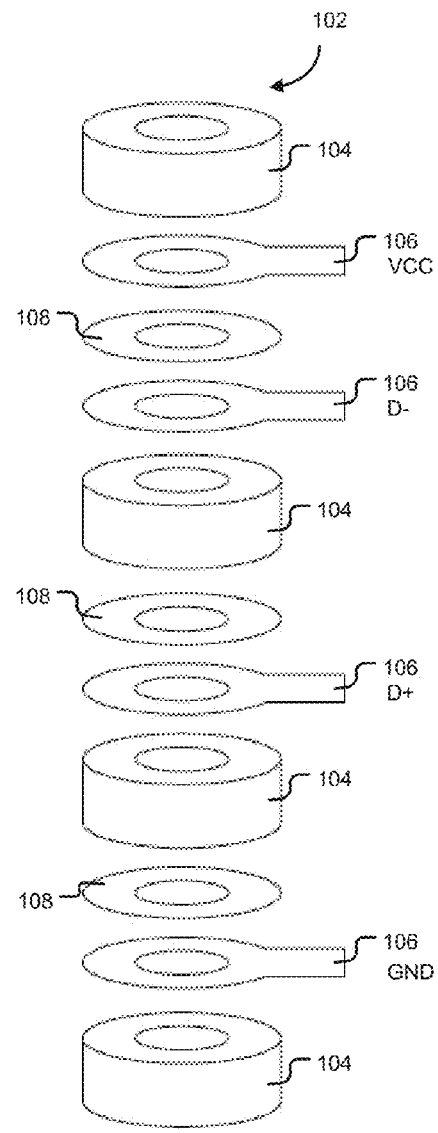
FIG. 30B is an exploded side view of the connector of FIG. 30A, exemplary of an embodiment.

FIGS. 30A and 30B shows a connector 102 according to an example embodiment. In particular, FIG. 30A is a top perspective view of connector 102 and FIG. 29B is an exploded view of the same connector. As shown, connector 102 is formed from an interleaved stack of cylindrical magnets 104, round conductive pads 106, and round insulative pads 108. Connector 102 is cylindrical in shape.

Each magnet 104 is substantially similar to a magnet 24 described above. Each magnet 104 may attract and attach to a corresponding magnets (i.e., with an opposing polarity) on a connector of another device to establish electrical connections between the devices through the magnets.

Each conductive pads 106 is formed from a thin layer of electrically conductive material, and is stacked in electrical communication with an associated magnet 104. Each conductive pad 106 includes a tab or pin that may be connected to a pin of an internal I/O interface of device 100 (FIG. 38), to facilitate signal transmission between connector 102 and the internal I/O interface.

Each insulative pad 108 is formed from a thin layer of electrically insulative material, and is stacked to provide electrical insulation between certain adjacent pairs of magnets 104 and conductive pads 106, as shown.

Collectively, the stack of magnets 104, pads 106, and pads 108 allow a signal bus to be established through connector 102. This signal bus may conform to a conventional signaling standard such as the Universal Serial Bus (USB) protocol. So, each conductive pad 106 and associated magnet 104 may carry a signal corresponding to a particular USB pin/wire, namely, VCC, D−, D+, GND. Thus, each connector 102 may carry signals in a manner similar to a conventional 4-pin USB connector. This allows device 100 to communicate through connector 102 using the USB protocol.

In other embodiments, connector 102 may be modified to include a stack having a greater or fewer number of magnets 104, pads 106, and pads 108. For example, a greater number of magnets 104, pads 106, and pads 108 may be included to increase bus width and thereby increase data throughput on the bus.

FIGS. 31A, 31B, and 31B show a connector 202, according to another example embodiment, that may be used in place of connector 102. Each connector 202 is adapted to mate with another connector 202 on another device. When mated, connectors 202 allow two devices to connect both mechanically and electrically. Connector 202 is cylindrical in shape.

FIG. 31A is a top perspective view of connector 202 including a stack of magnets 104a, 104b, 104c, 104d (collectively referred to as magnets 104) and an elongate plug 110 extending from a bottom end of the stack. Each magnet 104 in the stack includes a hole extending therethrough such that a channel is formed through the stack for receiving plug 110.

FIG. 31B is an exploded view of the connector 202 revealing the entire length of plug 110 including its constituent segments 112a through 112h. FIG. 31C shows the interconnections between segments 112a through 112h of plug 110.

In some embodiments, plug 110 may be similar to a multi-connection phone plug (e.g., TRS plug) or bantam-type plug. As shown, plug 110 includes a plurality of electrically isolated segments 112a through 112h, each presenting an outer contact surface formed from a conductive material. The segments 112a through 112h may each form a separate electrical connection As before, each magnet 104 of connector 202 attracts and attach to a corresponding magnet on another connector 102 of another device to establish electrical connections between the devices through the magnets.

Figure 38:
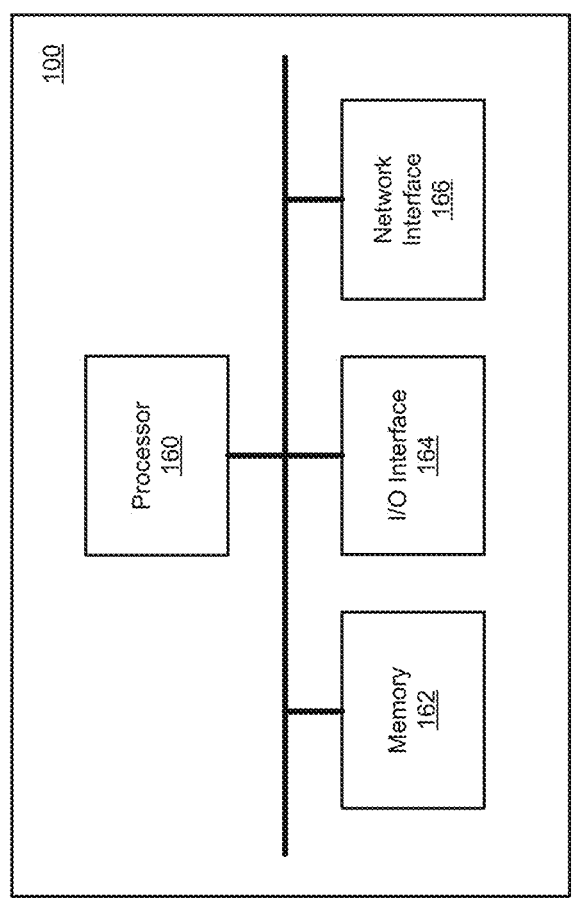
FIG. 38 is a schematic diagram of a computing device, exemplary of an embodiment.

When a top end of plug 110 (including segments 112a through 112d) is received within an interior channel defined by stacked magnets 104; segment 112a is in electrical communication with associated magnet 104a; segment 112b is in electrical communication with associated magnet 104b; segment 112c is in electrical communication with associated magnet 104c; and segment 112d is in electrical communication with associated magnet 104d. Meanwhile, the bottom end of plug 110 (including segments 112e through 112h) may extend into device 100 allowing segments 112e through 112h to interconnect with pins of an internal I/O interface of device 100 (FIG. 38).

At the same time, as shown in FIG. 31C, segment 112a is electrically connected to segment 112e; segment 112b is electrically connected to segment 112f; segment 112c is electrically connected to segment 112g; and segment 112d is electrically connected to segment 112h. In this way, each magnet 104 may be connected to a pin of an internal I/O interface of device 100 through plug 110.

Collectively, magnets 104 and plug 110 allow a signal bus to be established through connector 202. As before, this signal bus may conform to the USB protocol, and each magnet 104 and interconnected segments of plug 110 may carry a particular USB signal (VCC, D−, D+, GND), as shown in FIG. 31B.

Figure 32A:
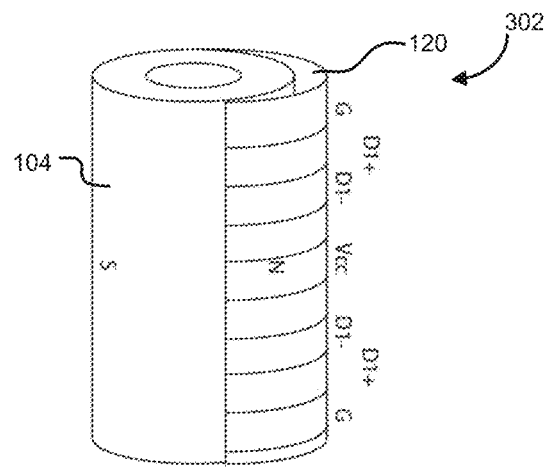
FIG. 32A is a side view of a connector of the device of FIG. 29, exemplary of an embodiment.
Figure 32B:
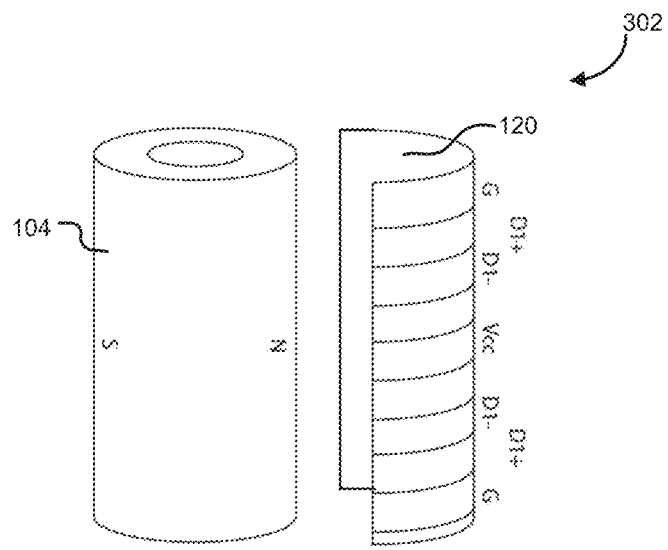
FIG. 32B is an exploded side view of the connector of FIG. 32A, exemplary of an embodiment.

FIGS. 32A and 32B show a connector 302, according to another example embodiment, that may also be used in place of connector 102. Each connector 302 is adapted to mate with another connector 302 of another device. When mated, connectors 302 allow two devices to connect both mechanically and electrically. Connector 302 is cylindrical in shape.

As shown, connector 302 includes a sleeve 120 that wraps at least partly around the vertical face of cylindrical magnet 104. The outer surface of sleeve 120 presents an array of contacts for carrying signals. When magnet 104 of connector 302 attracts and attach to corresponding magnet on a connector of another device, the contacts on sleeve 120 form electrical connections with corresponding contacts on the connector of the other device.

Sleeve 120 may be flexible. In an embodiment, sleeve 120 may be a conventional flexible flat cable (FFC).

Sleeve 120 may include a coating formed from Teflon or similar material. Such a coating my protect sleeve 120 from wear and tear during operation. Such a coating may also smoothen rotations of a device 100 relative to an interconnected device about a vertical axis of connector 302.

At least one end of sleeve 120 is insertable into an interior of a device such as device 100, for electrical connection with internal components of the device. In some embodiments, sleeve 120 may wrap substantially or wholly around the vertical face of cylindrical magnet 104. When sleeve 120 is wrapped substantially or wholly around the vertical face of magnet 104, the free ends of sleeve 120 may unite, and press together to form a single flat cable that is insertable into a device such as device 100.

So, as will be appreciated by those of ordinary skill in the art, the length of sleeve 120 may be adjusted, to wrap along a desired portion of the vertical face of magnet 104, and to extend a desired distance into the interior of a device.

In some embodiments, connector 302 may include a thin shim interposed between sleeve 120 and magnet 104 when sleeve 120 is wrapped around magnet 104. The shim spans at least the portion of sleeve 120 expected to contact another device (e.g., by way of a complementary connector on that device). In an embodiment, the shim may be a thin hollow cylinder that sheathes magnet 104. The shim may be formed of brass. However, the shim could also be formed of another suitable material that is sufficiently malleable to be wrapped around portions of magnet 104, and is sufficiently rigid to maintain its shape during operation. (e.g., as connector 302 comes into contact with other connectors). For example, the shim could also be formed of copper. In yet other embodiments, the shim could be formed of another metal, a carbon-based material, a plastic, or a composite material. In operation, the shim serves to spread out mechanical forces over the surface of magnet 104, and minimizes points loads on magnet 104. The shim also smoothens rotations of a device 100 relative to an interconnected device about a vertical axis of connector 302.

In some embodiments, the shim may be integral to sleeve 120, and may, for example, be provided as a backing or substrate of sleeve 120. In such embodiments, the shim may serve as a ground plane for sleeve 120 (e.g., when the shim is formed of copper), and thereby facilitates signal transmission through sleeve 120. The shim may also provide electromagnetic shielding.

Collectively, the contacts on sleeve 120 allow a signal bus to be established through connector 302. As before, this signal bus may conform to the USB protocol, and each may be assigned to carry a USB signal (VCC, D−, D+, GND), as shown in FIGS. 32A and 32B.

Figure 33B:
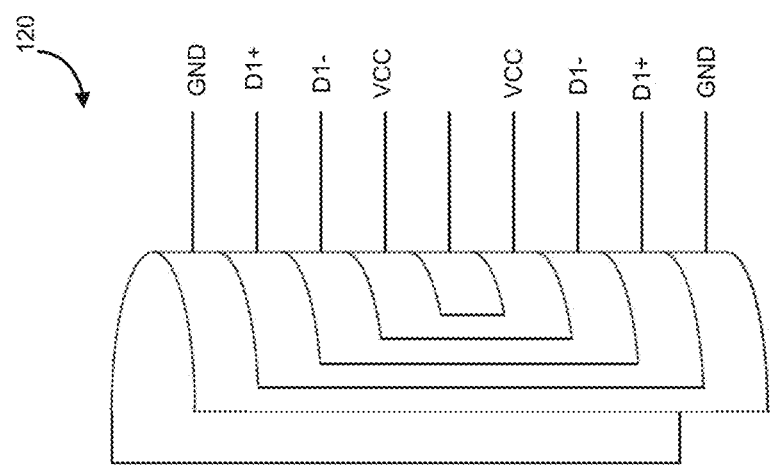
FIGS. 33A and 33B are views of a sleeve of the connector of FIG. 32A, exemplary of an embodiment.
Figure 33A:
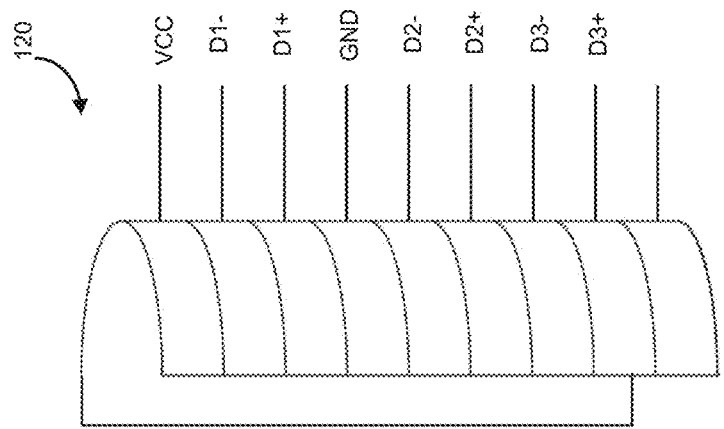

In one arrangement, each contact on sleeve 120 may be used to carry a particular USB signal (i.e., one of VCC, D1−, D1+, GND, D2−, D2+, D3−, D3+), as shown in FIG. 33A. In this arrangement, three data channels may be provided, namely, D1, D2 and D3.

In another arrangement, the contacts on sleeve 120 may be paired, and each pair of contacts may be electrically connected and used to carry a particular USB signal (i.e., one of VCC, D−, D+, GND), as shown in FIG. 33B. Further, the USB signals may be assigned to the contacts in a vertically symmetrical order. This redundancy of contacts and vertically symmetry allows connector 302 to be agnostic to its vertical orientation. In other words, connector 302 may be mated to another connector 302 to establish electrical and mechanical connections, regardless of their respective vertical orientations.

Of course, connectors 102 and 202 may also be modified to have a similar redundancy and vertical symmetry of contacts (i.e., magnets 104), to thereby provide connectors that are agnostic to their vertical orientation.

The cylindrically shaped connectors described herein (e.g., connectors 102, 202, and 302) allow device 100 to be rotated about a vertical axis of the connector when connected to another device by way of that connector. This allows the orientation of device 100 to be adjusted relative to connected devices, without interrupting the mechanical or electrical connections therebetween. Embodiments of the cylindrically shaped connectors described herein (e.g., connectors 102, 202, and 302) may be genderless, and may mate with a like cylindrically shaped connectors.

In other embodiments, the cylindrically shaped connectors described herein may be modified to adhere to a protocol/connector pin-out format other than USB or to adhere to a custom protocol/connector pin-out format.

Figure 34A:
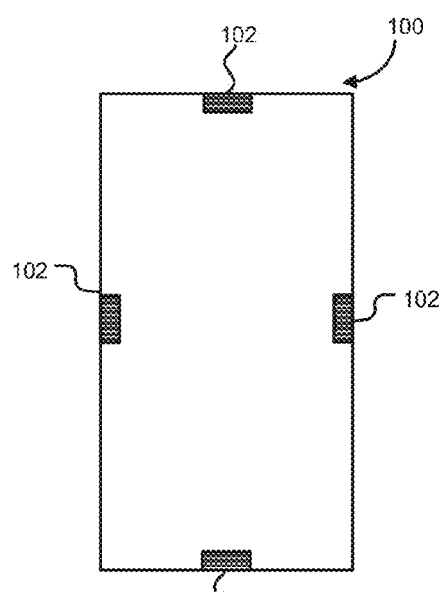
FIGS. 34A, 34B, and 34C are views of computing devices including connectors, exemplary of embodiments.
Figure 34B:
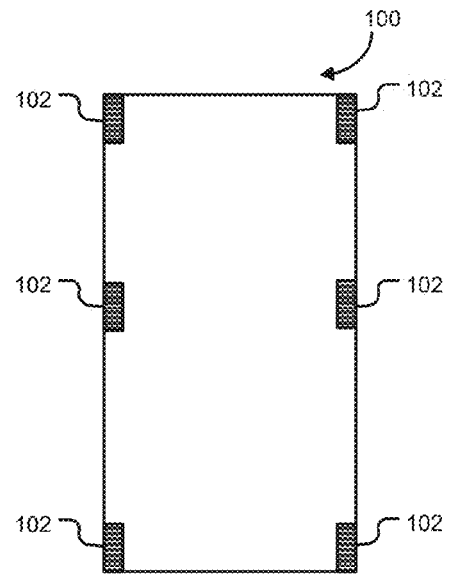
Figure 34C:
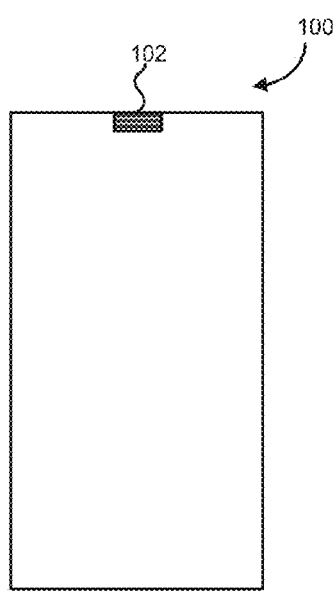

In other embodiments, the connectors described herein may have another shape. For example, the connectors may be cuboid or prism-shaped (e.g., triangular prism, pentagonal prism, hexagonal prism, etc.). As shown in FIGS. 29A, 29B and 29C, connectors 102 may be provided at the corners of device 100. However, connectors 102 can also be provided centrally along the sides of device 100, as shown in FIG. 34A. Further, the number of connectors 102 provided on a device 100 may be varied. For example, a greater number of connectors 102 may be provided, as shown in FIG. 34B. Similarly, a fewer number of connectors 102 may be provided, as shown in FIG. 34C. In particular, each device 100 may include only a single connector 102.

Figure 42A:
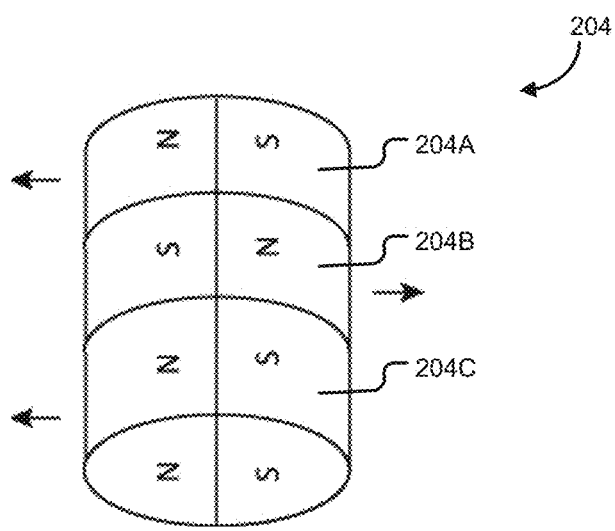
FIGS. 42A, 42B, and 42C are views of stacks of magnets, for inclusion in a connector, exemplary of embodiments.

In some embodiments, magnet 104 (FIGS. 32A and 32B) of connector 302 may be replaced by a stack of cylindrical magnets 204 as shown in FIG. 42A. In an embodiment, stack 204 may include three magnets, namely, two end magnets 204A and 204C and a center magnet 204B. Magnets 204A, 204B, and 204C may be arranged to have orientations as shown, i.e., with end magnets 204A and 204C having a common orientation that is opposite to the orientation of center magnet 204B. A connector 302 including stack 204 may mate with another connector 302 with magnets arranged with orientations complementary to the magnets of stack 204.

So arranged, end magnets 204A and 204C may facilitate axial alignment of a connector 302 with another connector 302 (i.e., alignment of the vertical axes of the connectors), when the connectors mate. In particular, corresponding end magnets 204A and 204C of the two connectors 302 cooperate to resist mechanical forces that would otherwise bring the two connectors 302 out of axial alignment, e.g., to twist part. Meanwhile, center magnet 204C provides an attractive force to facilitate adhesion of connector 302 to a mated connector. In some embodiments, magnet 204C may be larger than end magnets 204A and 204B. As will be appreciated, a larger center magnet 204C may be desirable to increase the attractive force of connector 302.

Figure 42B:
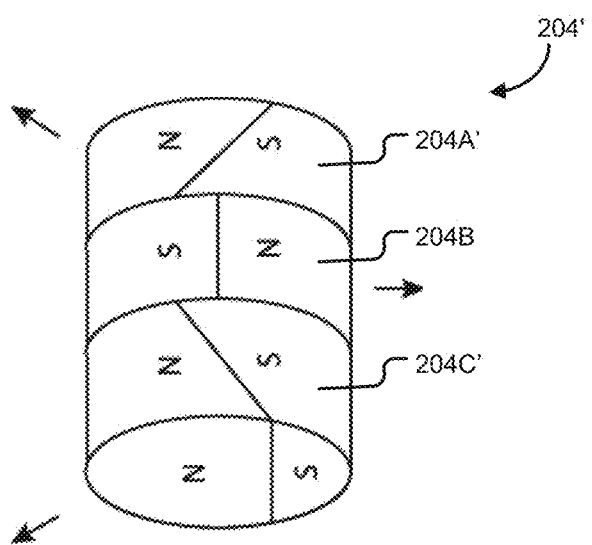

FIG. 42B depicts a stack 204' according to another embodiment. Stack 204' is substantially similar to stack 204, except the orientation of its end magnets are different. As shown, stack 204' includes two end magnets 204A' and 204C' and a center magnet 20B, with end magnets 204A' and 204C' oriented diagonally relative to the orientation of center magnet 204B'. For example, end magnet 204A' may oriented diagonally-up relative to the orientation of center magnet 204B, while end magnet 204C' may be oriented diagonally-down relative to the orientation of center magnet 204B. In the depicted embodiment, end magnets 204A' and 204C' are each oriented diagonally at an angle of approximately 45 degrees relative to the orientation of the center magnet 204B. However, other angles may be used. Compared to stack 204, stack 204' provides improved alignment, but reduced attraction.

Figure 42C:
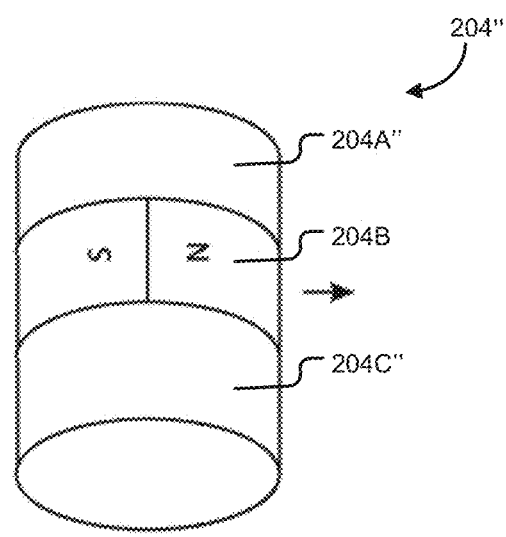

FIG. 42C depicts a stack 204" according to yet another embodiment. Stack 204" is substantially similar to stack 204 except end magnets 204A and 204C are replaced with similarly shaped ferrous stops. As will be appreciated, the ferrous stops will become weakly magnetized by center magnet 204B. Thus stack 204" facilitates alignment and provides attraction, albeit more weakly than stack 204 or stack 204". Replacing end magnets 204A and 204C with ferrous stops may reduce manufacturing costs.

The number of magnets in stacks 204 may be varied. In particular, the number of magnets between end magnets 204A and 204C may be varied. For example, in an embodiment, the number of magnets between end magnets 204A and 204C and may be increased to provide key encoding, as described herein. The number of magnets in stack 204' and stack 204" may also be varied in a similar manner.

FIGS. 43A to 43G depict an assembly 202 in accordance with an example embodiment. Assembly 202 includes a connector housing 208 for housing a connector, e.g., connector 404 as shown. In other embodiments, housing 208 may also be used to house another connector such as, e.g., a connector 102, 202, or 302. Housing 208 may be used to mount a housed connector to a device (e.g., device 100).

Figure 43A:
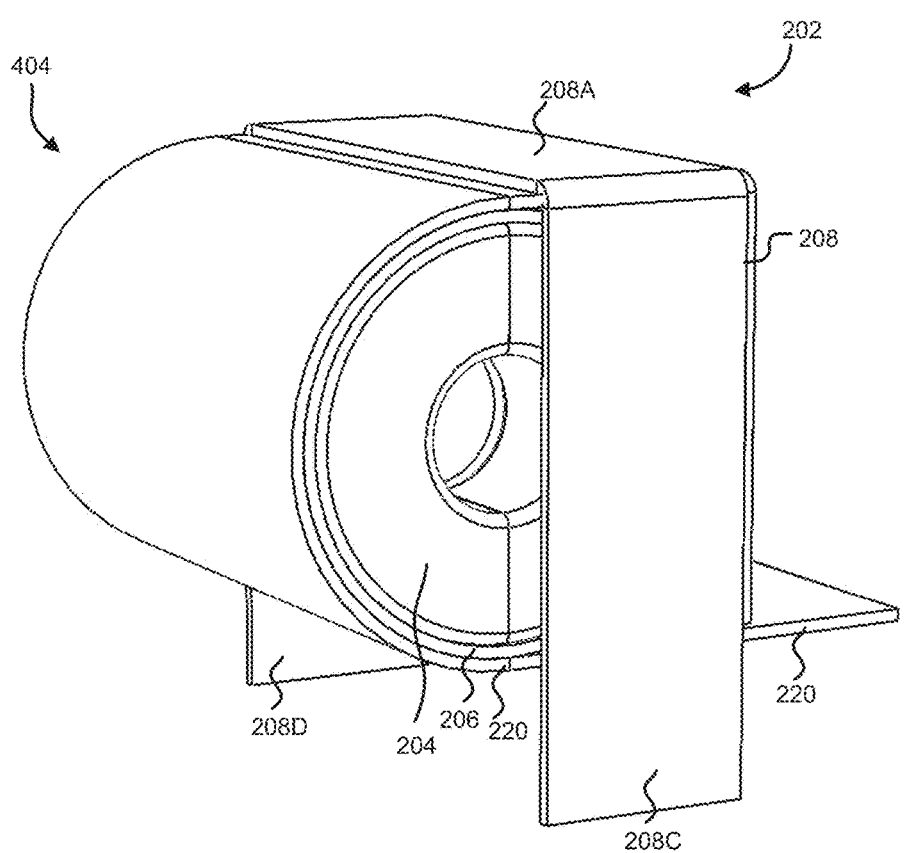
FIGS. 43A, 43B, 43C, 43D, 43E, 43F, and 43G are views of an assembly including a connector and a connector housing, exemplary of embodiments.
Figure 43B:
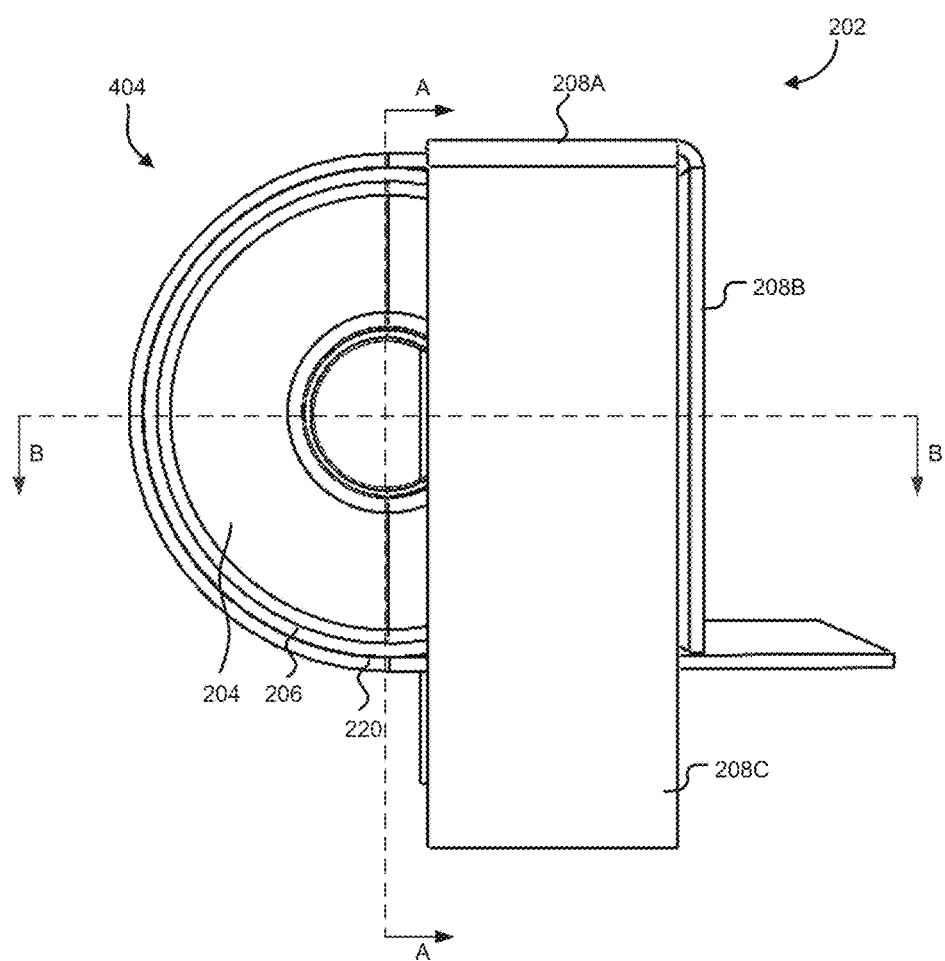

Referring to FIGS. 43A and 43B, housing 208 includes a plurality of walls, namely, top wall 208A, side walls 208C and 208D, and rear wall 208B, which collectively define a partially-enclosed cavity for receiving a connector. The walls of housing 208 may be formed from metal. As such, housing 208 provides structural support for an housed connector, and also provides electromagnetic shielding around that connector.

As depicted, a connector 404 is received within housing 208. Connector 404 includes stack 204, including three cylindrical magnets. A sleeve 220 and a shim 206 are wrapped around stack 204, with shim 206 interposed between sleeve 220 and stack 204. Sleeve 220 is substantially similar to sleeve 120. So, the outer surface of sleeve 220 presents an array of contacts for carrying signals. Meanwhile, one end of sleeve 220 extends past housing 208 into the interior of a device 100 to electrically connect with components therein. Sleeve 220 may be fixedly secured to housing 208, e.g., at the two ends of sleeve 220. As depicted, each magnets of stack 204 has a hollow central cavity. However, the magnets need not be hollow and solid magnets may also be used.

Figure 43C:
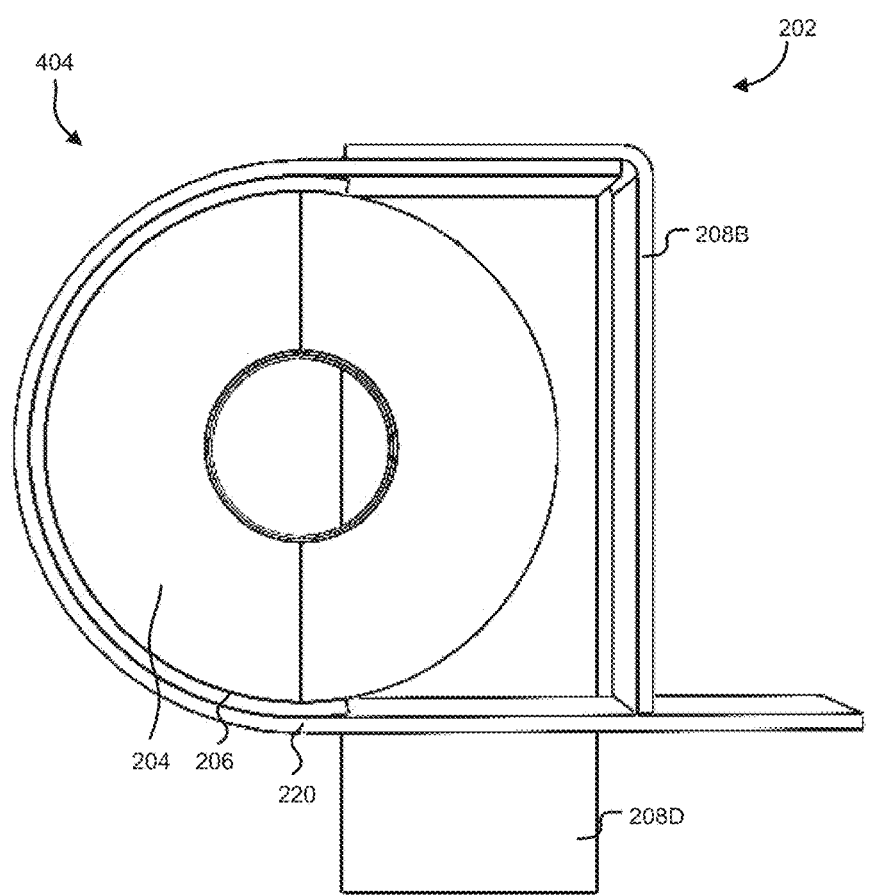

FIG. 43C is view of assembly 202 with side wall 208C removed to show the portions of stack 204 and sleeve 330 occluded by side wall 208C. As shown, shim 206 has a semi-circular cross-section, and spans the portion of sleeve 220 expected to contact another device.

Further, a space is provided between connector 404 and rear wall 208B, allowing connector 404 to recede slightly into housing 202. In this way, in embodiments including a casing 16 (FIG. 20), connector 404 may be drawn away from casing 16 when not in use (e.g., by tension in sleeve 220). Connector 404 may be drawn forward from a recessed position when presented to a magnetic material, e.g., the magnets of another connector. Forward movement of connector 404 is constrained by attachment of sleeve 220 to housing 208.

Figure 43D:
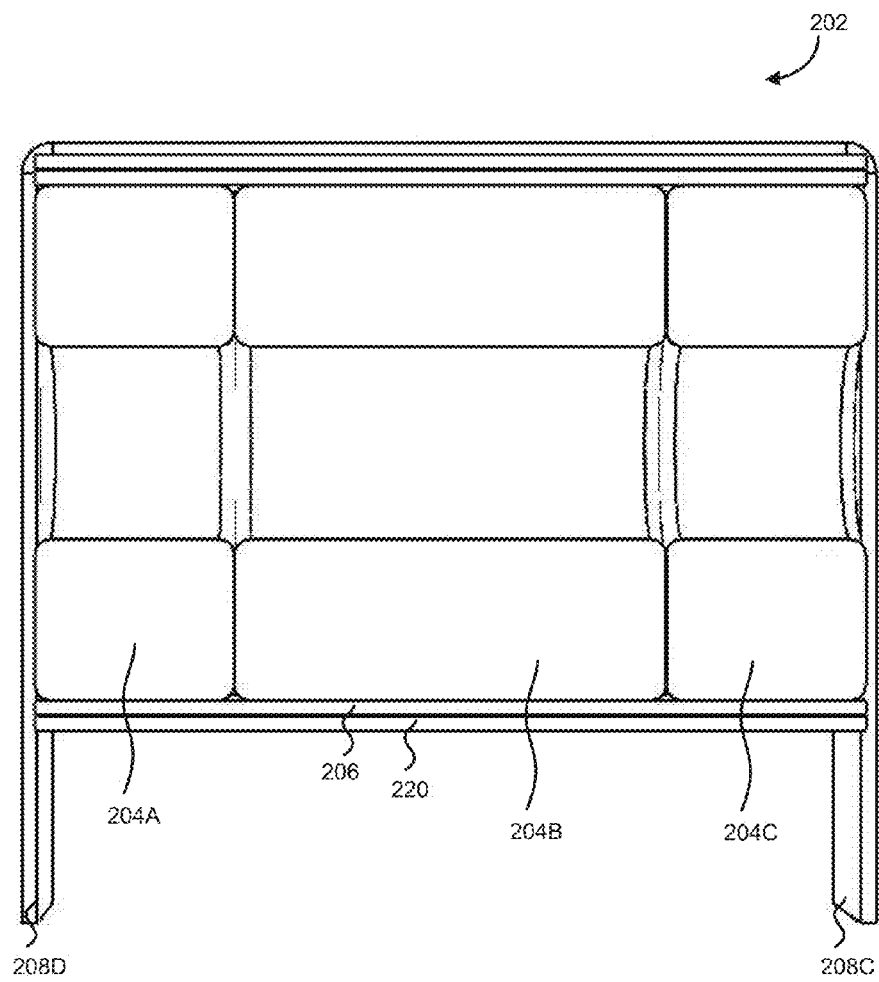
Figure 43E:
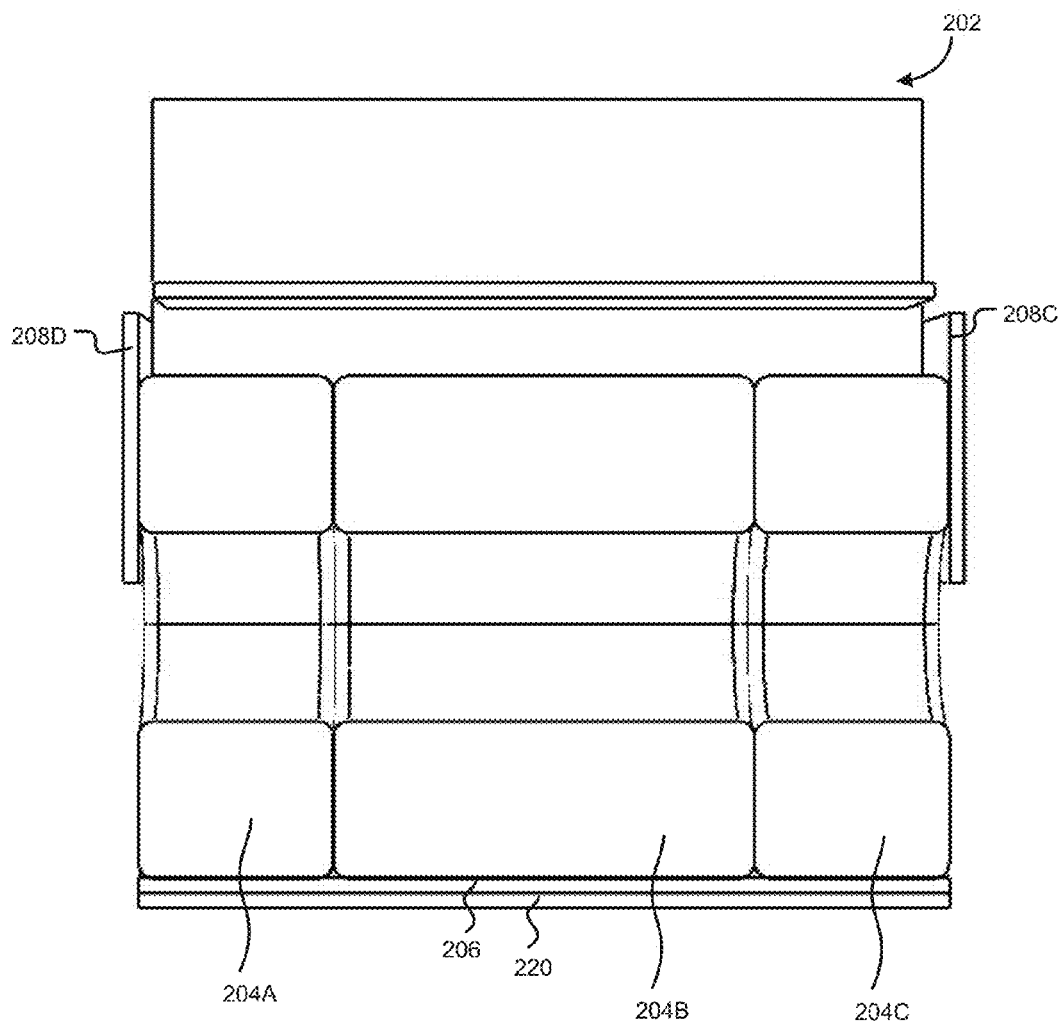

FIG. 43D is a cross-sectional view of assembly 202 taken along line A-A of FIG. 43B, while FIG. 43E is a cross-sectional view of assembly 202 taken along line B-B of FIG. 43B. As depicted in FIGS. 43D and 43E, stack 204 includes three magnets, namely end magnets 204A and 204C, and center magnet 204B, with center magnet 204B being larger than end magnets 204A and 204C.

Figure 43F:
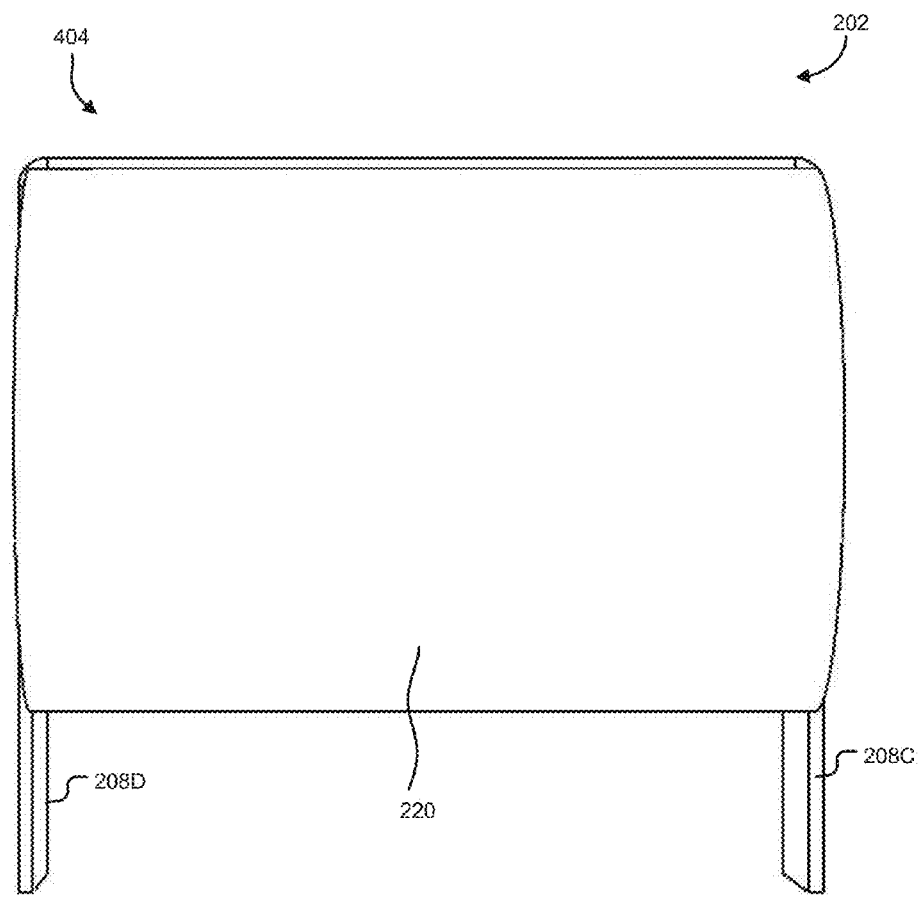
Figure 43G:
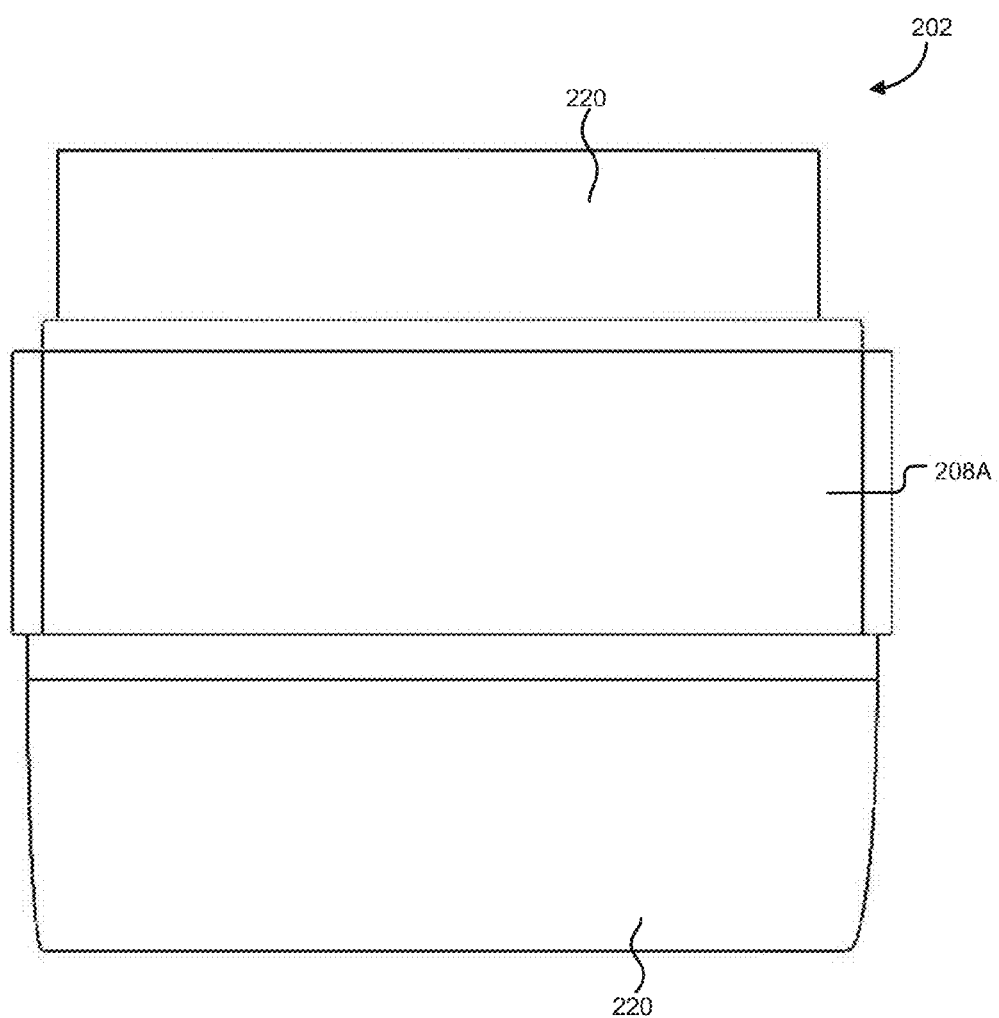

FIG. 43F depicts a front elevation view of assembly 202. As shown, sleeve 220 of connector 404 is presented for mating with another connector. FIG. 43G is a top plan view of assembly 202, showing top wall 208A.

Figure 44:
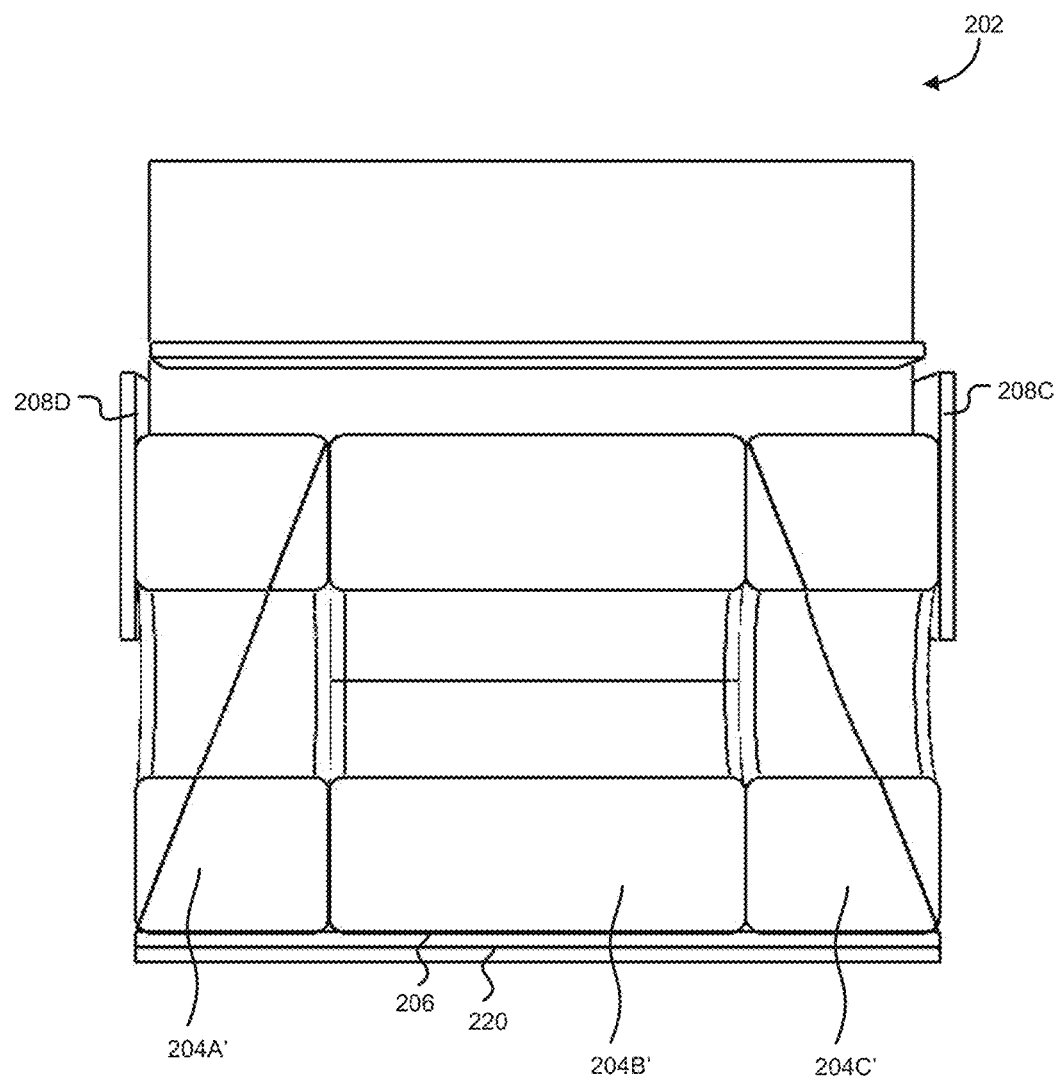
FIG. 44 is a view of an assembly including a connector and a connector housing, exemplary of an embodiment.

Connector 404 could be modified by replacing stack 204 with a similar stack of magnetics (e.g., stack 204' or stack 204") or a single cylindrical magnet (e.g., magnet 104). For example, FIG. 44 is a cross-sectional view of assembly 202 including stack 204' instead of stack 204, taken along line B-B of FIG. 43B.

FIGS. 45A to 45F depict a connector housing 308 in accordance with another example embodiment. Like housing 208, housing 308 is adapted to house a connector (e.g., connector 102, 202, 302, or 404) and may be used to mount a housed connector to a device (e.g., device 100).

Figure 45A:
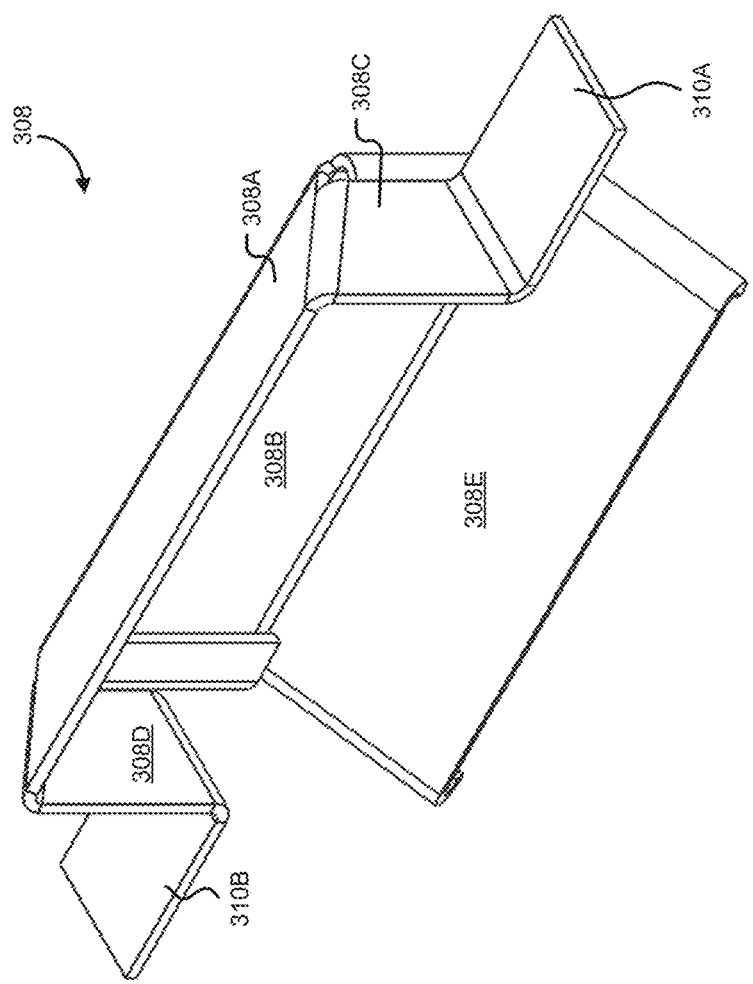
FIGS. 45A, 45B, 45C, 45D, 45E and 45F are views of a connector housing, exemplary of an embodiment.

FIG. 45A is a front perspective view of housing 308. As depicted, housing 308 includes a top wall 308A, sidewalls 308C and 308D, a rear wall 308B, and a bottom wall 308E, which collectively define a partially-enclosed cavity for receiving a connector. Housing 308 also includes flanges 310A and 310B extending from sidewalls 308B and 308C, respectively. As shown, flanges 310A and 310B may extend from these sidewalls at right angles. Flanges 310A and 310B provide a mounting point for housing 308 to be fixedly mounted to a device 100 (e.g., by soldering, screws, adhesives, or the like).

Figure 45B:
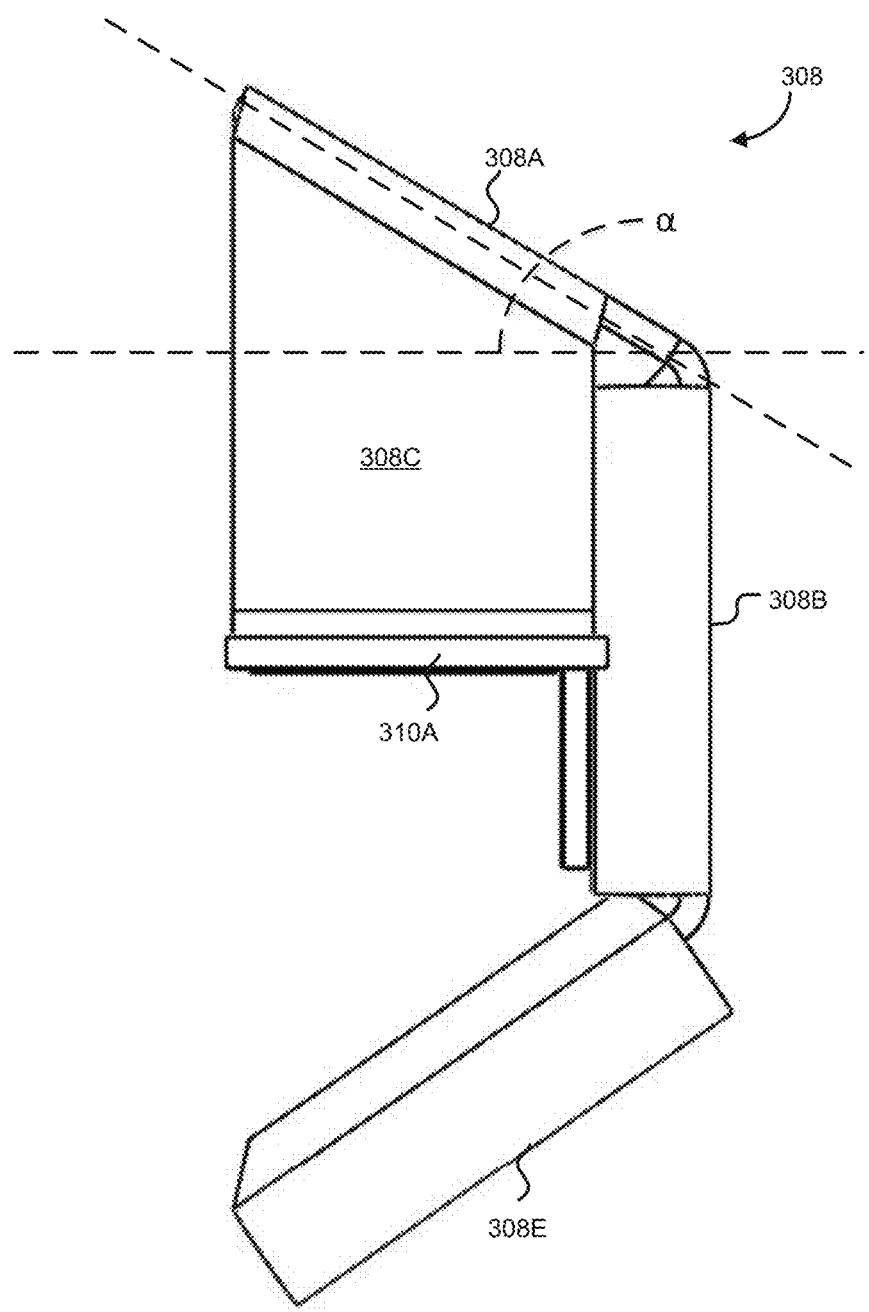

FIG. 45B is a side elevation view of housing 308. As depicted, top wall 308A and bottom wall 308E each extend from rear wall 308B at an angle α of approximately 30 degrees. So, unlike housing 208 which is shaped substantially like a rectangular prism, housing 308 is shaped substantially like a trapezoidal prism. This shaping of housing 308 allows a greater surface area of a housed connector to be exposed, as further detailed below. In other embodiments, the angle α may vary, e.g., between 10 degrees and 90 degrees.

Figure 45C:
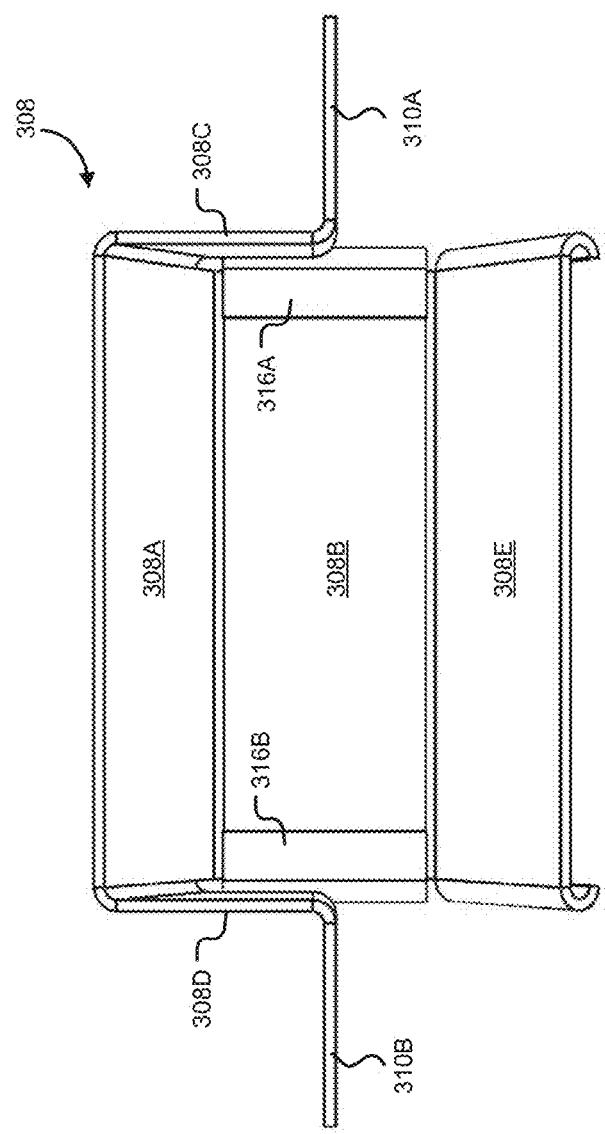
Figure 45D:
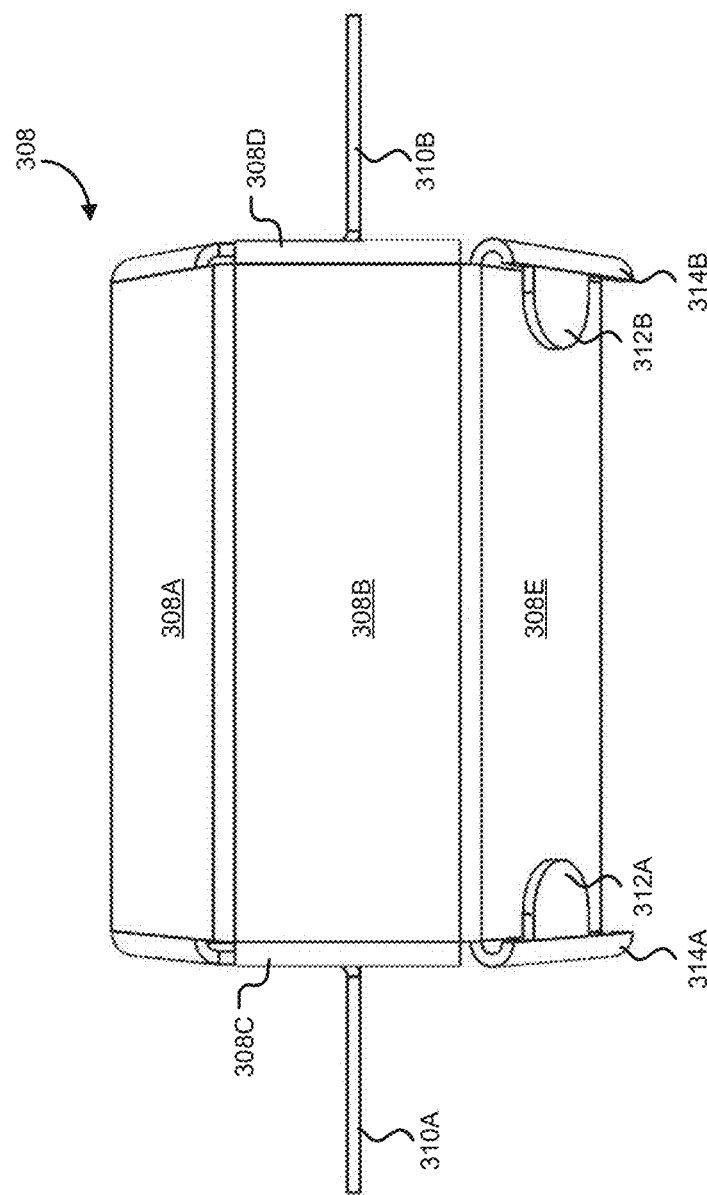
Figure 45E:
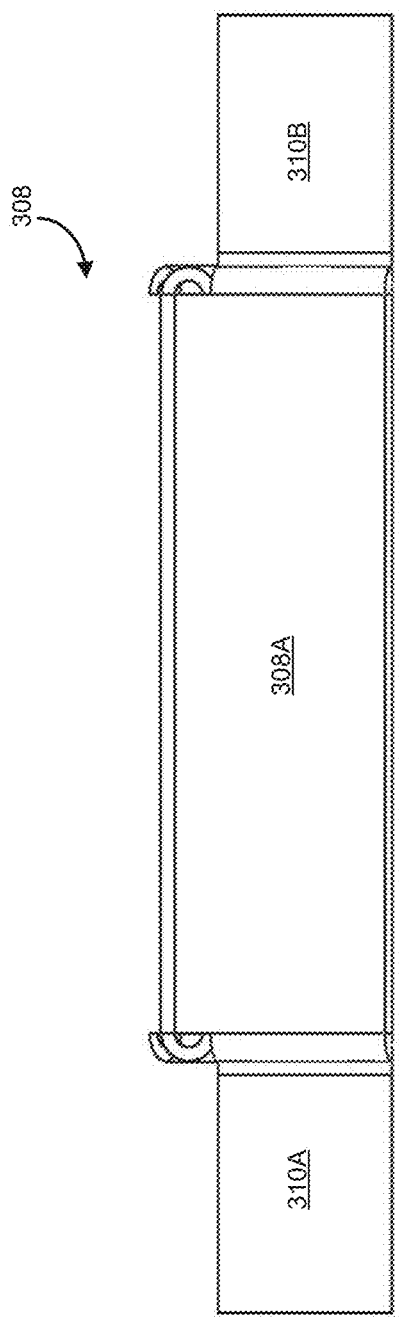

FIG. 45C is a front elevation view of housing 308; FIG. 45D is a rear elevation view of housing 308; FIG. 45E is a top plan view of housing 308; and FIG. 45F is a bottom plan view of housing 308.

Figure 45F:
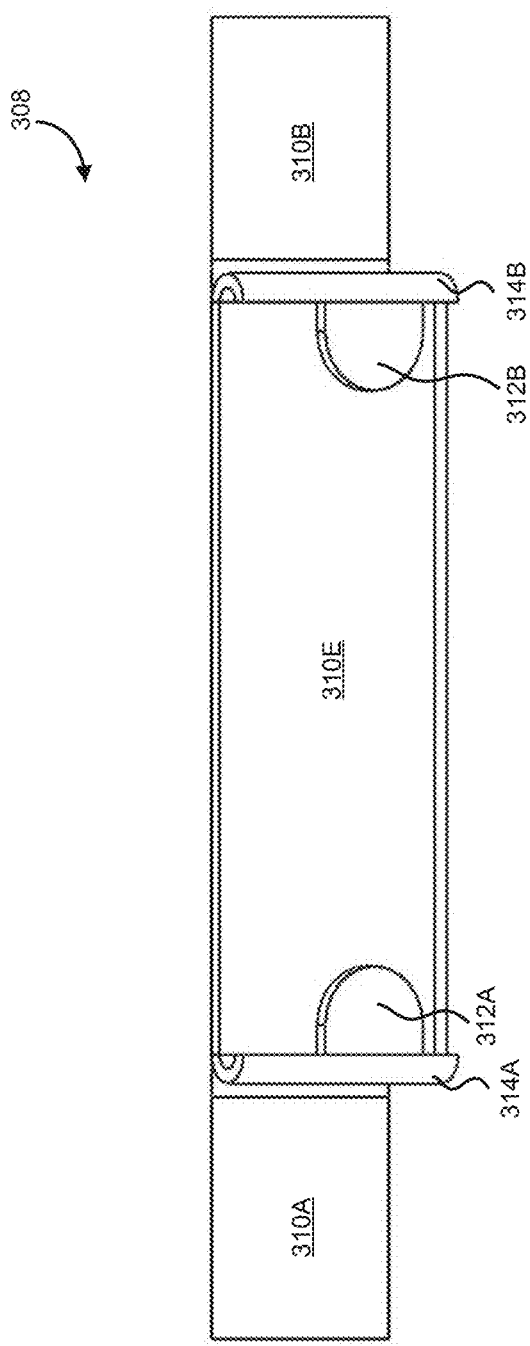

As best seen in FIG. 45F, housing 308 includes restraints 314A and 315B extending from bottom wall 310E. Restraints 314A and 315B each have a curved lip that defines a channel for receiving a side edge of a sleeve 220 of a housed connector. Restraints 314A and 314B respectively include tabs 312A and 312B. Tabs 312A and 312B are spaced from bottom wall 310E at a distance slightly greater than the thickness of 220. In this way, when the edges of a sleeve 220 are inserted into restraints 314A and 314B, tabs 312A and 312B hold sleeve 220 to housing 308. When sleeve 220 is so held, a free end of sleeve 220 may extend substantially parallel to rear wall 310E, e.g., into a device 100.

A similar set of restraints 316A/316B (FIG. 45C) may be provided at rear wall 308B to hold sleeve 220 thereto.

Housing 308 is otherwise substantially similar to housing 208. For example, housing 308 may be formed from similar materials, and may have similar shielding properties.

FIGS. 46A to 46H depict an assembly 302 in accordance with another example embodiment. Assembly 302 includes connector housing 308, which houses a connector 404.

Figure 46A:
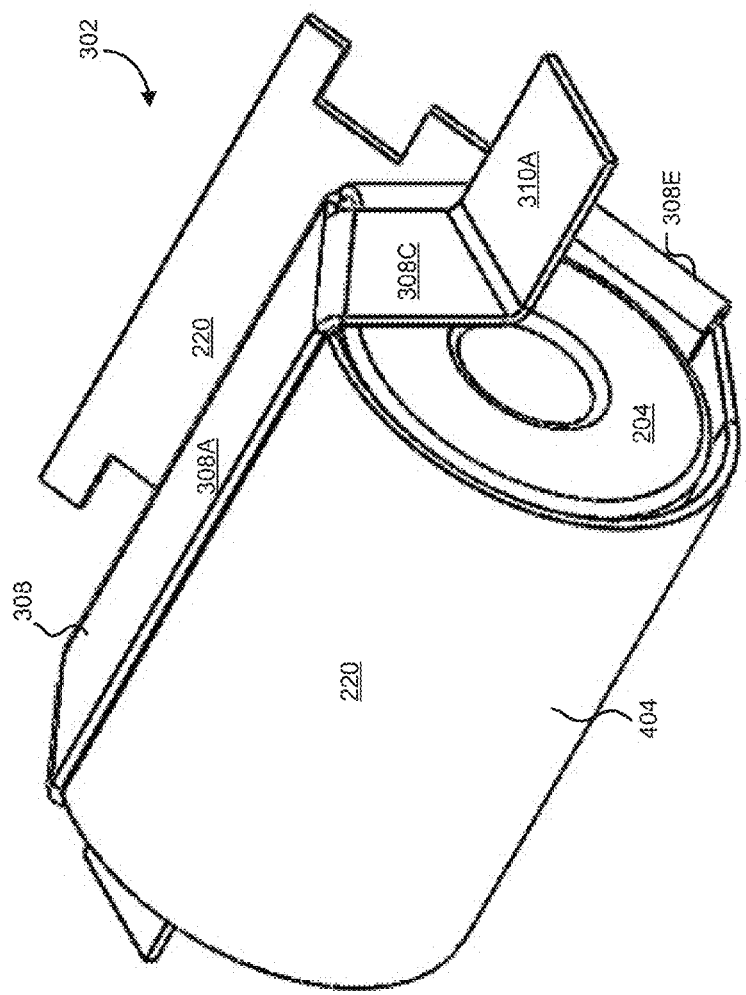
FIGS. 46A, 46B, 46C, 46D, 46E, 46F, 46G, and 46H are views of an assembly including a connector and the connector housing of FIGS. 45A, 45B, 45C, 45D, 45E and 45F, exemplary of an embodiment.
Figure 46B:
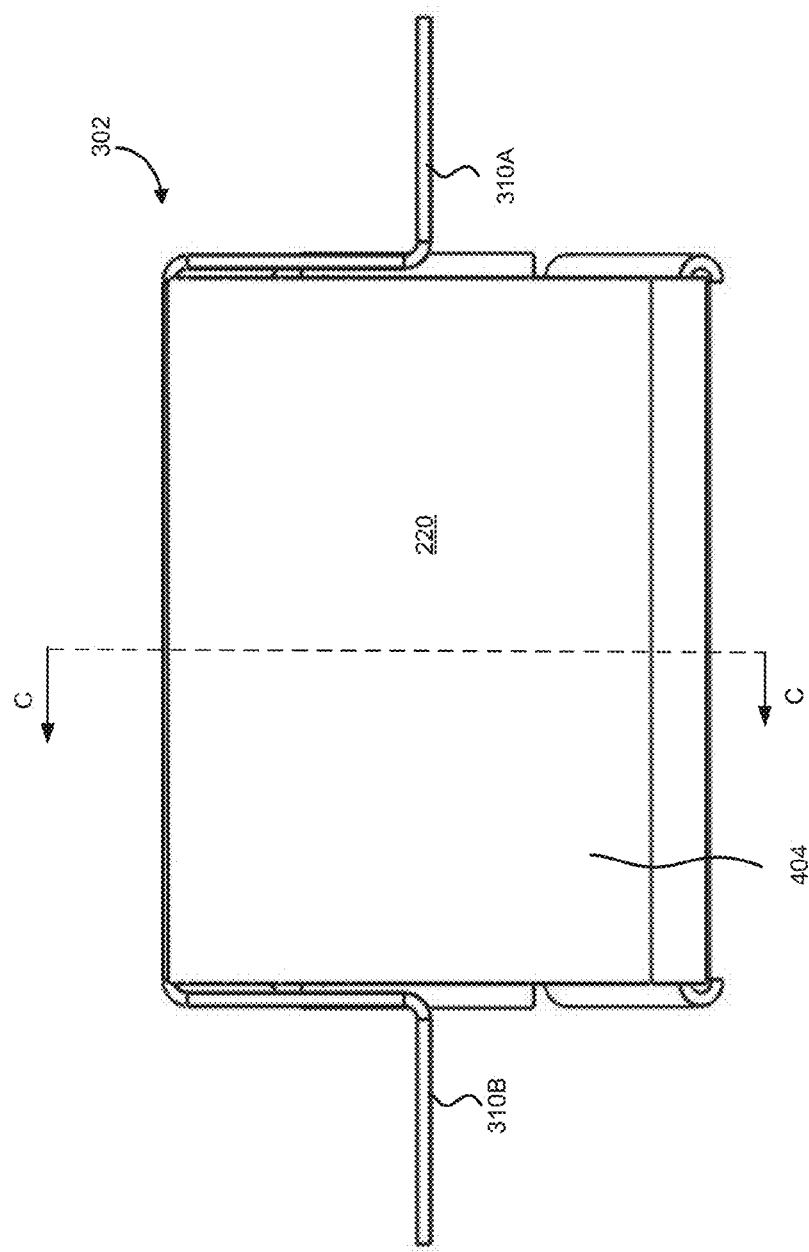
Figure 46C:
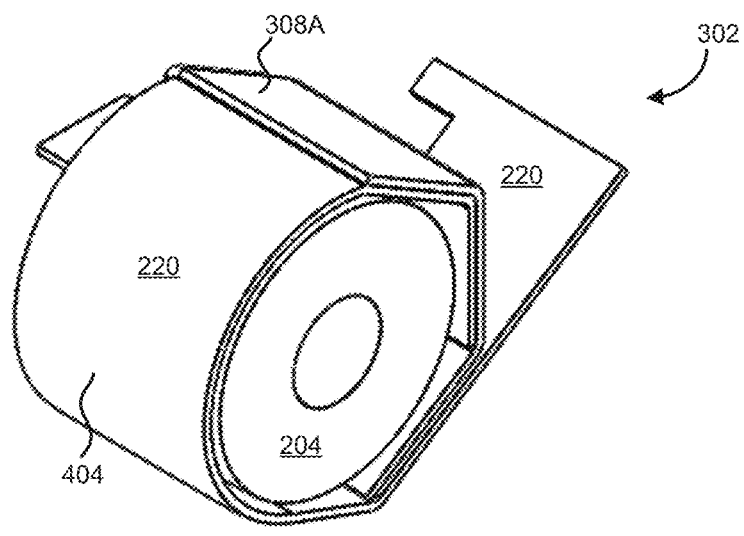

FIG. 46A is a front perspective view of assembly 302, while FIG. 46B is a front elevation view of assembly 302. FIG. 46C is a perspective cross-sectional view of assembly 302 taken along line C-C of FIG. 46B, while FIG. 46D is an elevation cross-sectional view of assembly 302 taken along line C-C of FIG. 46B.

Figure 46D:
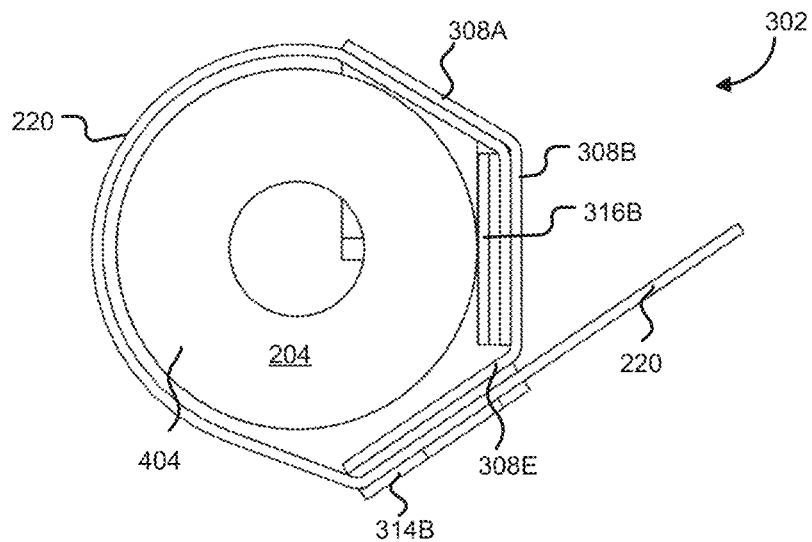

As best seen in FIG. 46D, one end of sleeve 220 may be fixedly attached to rear wall 308B (e.g., when held in restraints 316A/316B). Meanwhile, a free end of sleeve 220 may be inserted in restraints 314A/314B below bottom wall 308E.

Figure 46E:
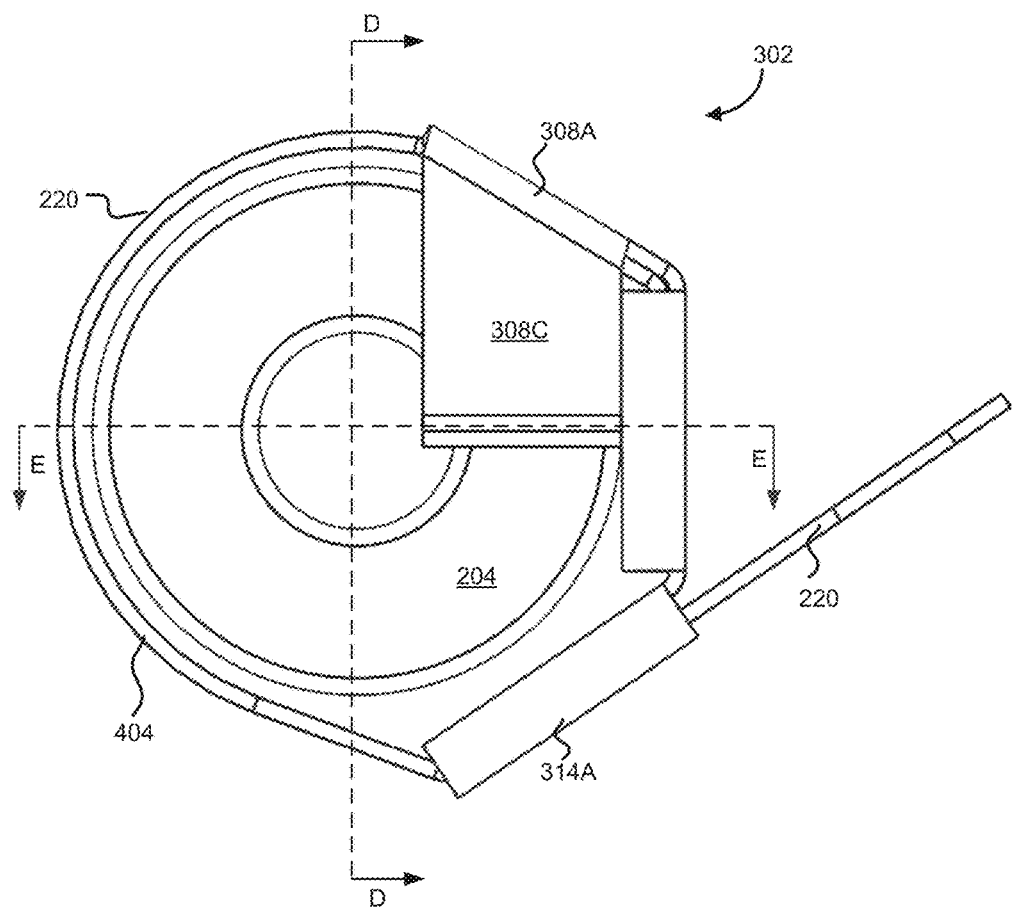

FIG. 46E is a side elevation view of assembly 302. As noted, compared to housing 208, housing 308 allows a greater surface area of a housed connector (e.g., connector 404) to be exposed for interconnection. In particular, as depicted, whereas housing 208 exposes an approximately 180 degree cross-section of connector 404 (FIG. 43B), housing 308 may expose an approximately 270 degree cross-section of connector 404. During operation, this allows a greater portion of the surface area of connector 404 to be used for interconnection, e.g., to other connectors. Conveniently, devices 100 including connectors 404 may be connected to each other over a wider range of angles. Further, a greater number of devices 100 may be connected to a single connector 404.

Figure 46F:
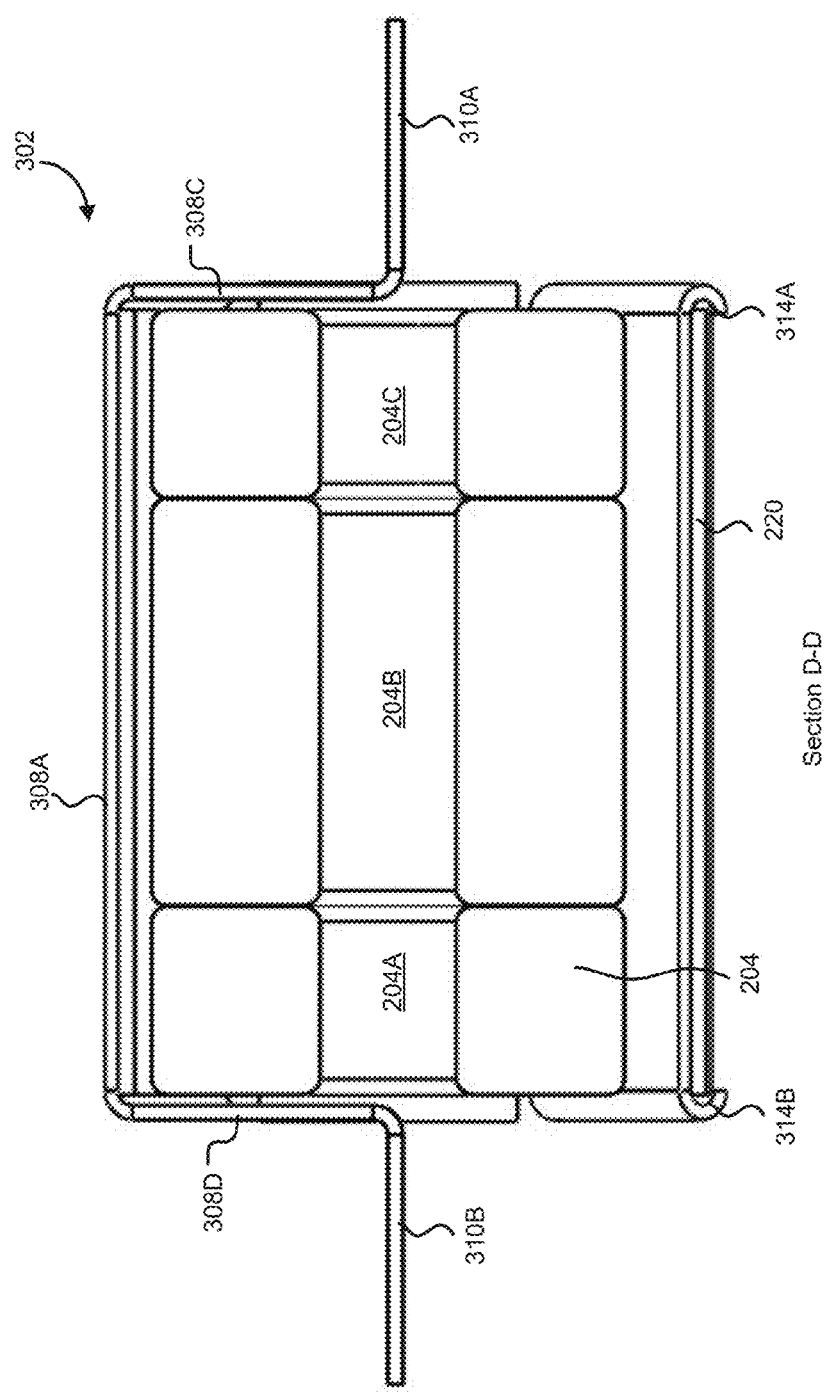
Figure 46G:
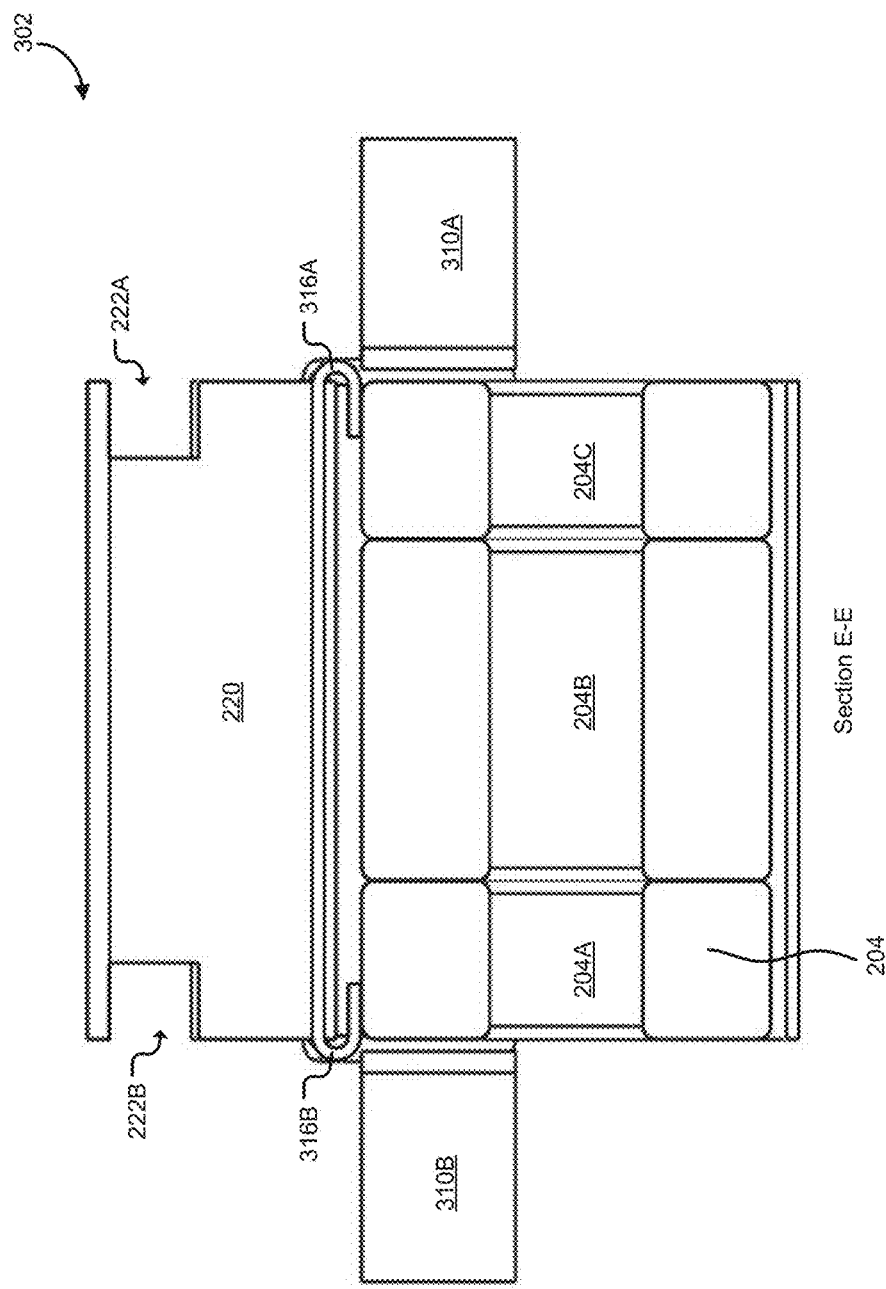

FIG. 46F is a cross-sectional view of assembly 302 taken along line D-D of FIG. 46E, while FIG. 46G is a cross-sectional view of assembly 302 taken along line E-E of FIG. 46E. As depicted, connector 404 includes stack of magnets 204, including end magnets 204A and 204C, and center magnet 204B. Of course, connector 404 may also include a different stack of magnets (e.g., stack 204' or stack 204").

Figure 46H:
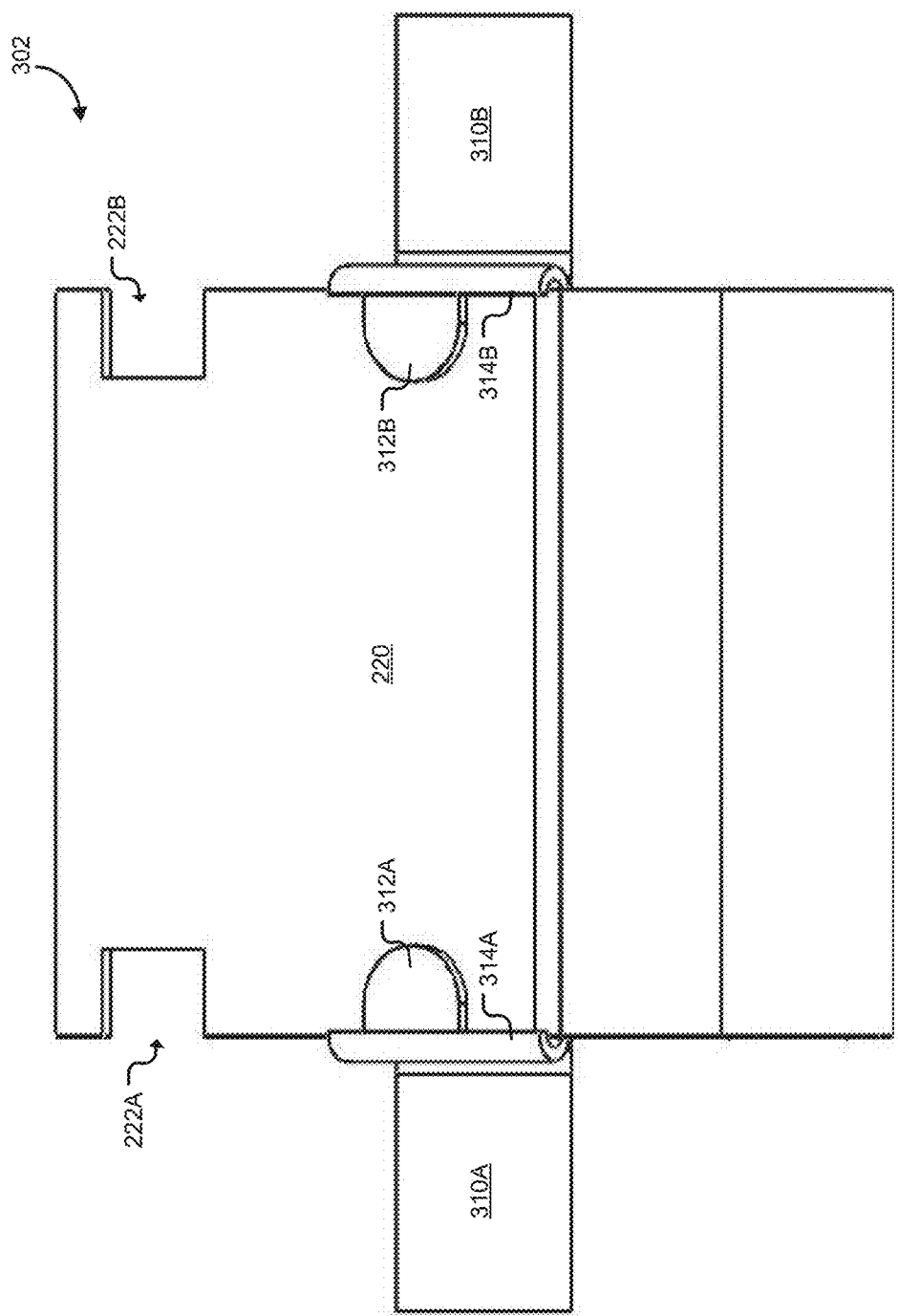

FIG. 46H is a bottom plan view of assembly 302. As shown, the free end of sleeve 220 may include cut-outs 222A and 222B at its side edges. Cut-outs 222A and 222B are sized to be complementary to tabs 312A and 312B. So, sleeve 220 may be positioned to align cut-outs 222A and 22B with tabs 312A and 312, allowing sleeve 220 to be passed through tabs 312A and 312B and then pulled forward (upward in the orientation depicted in FIG. 46H) causing sleeve 220 to be locked in place by tabs 312A/312B.

Figure 35A:
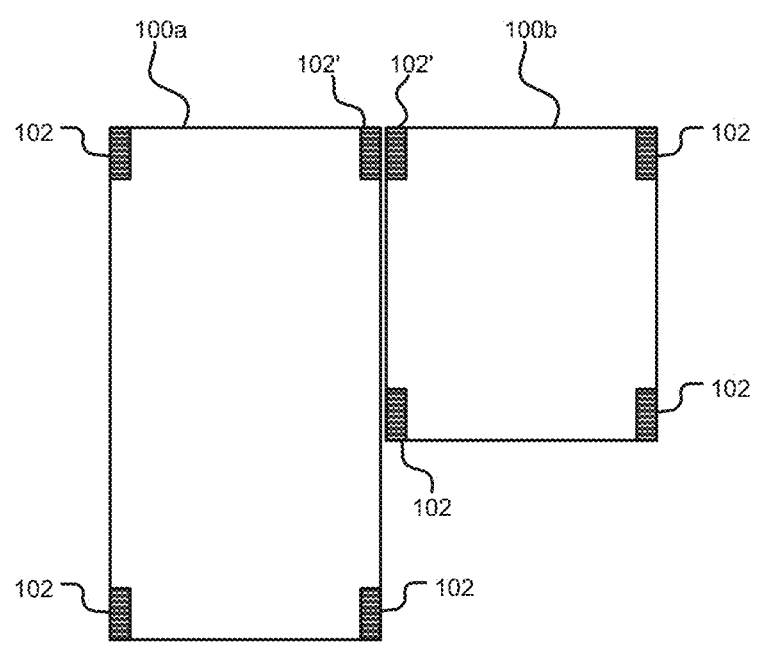
FIGS. 35A, 35B, and 35C are views of interconnected computing devices, exemplary of embodiments.

FIG. 35A shows devices 100a and 100b interconnected by way of a pair of connectors 102'. The magnets of connectors 102' mutually attract, thereby joining the two connectors 102'. The remaining connectors devices 100a and 100b, namely, connectors 102 are inactive.

Figure 35B:
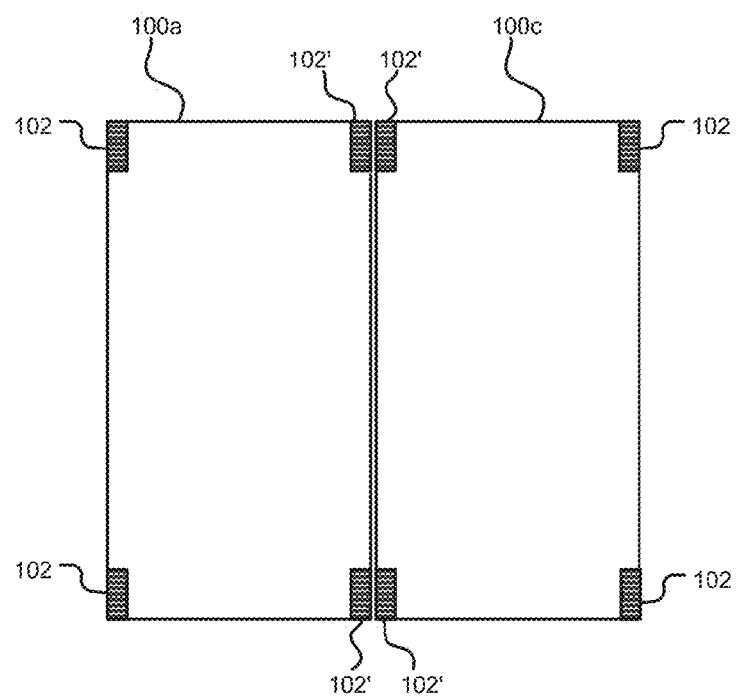

FIG. 35B shows devices 100a and 100b interconnected by way of two pairs of connectors 102'. The number data/power paths between devices 100a and 100c is twice that between devices 100a and 100b. For example, when connectors 102' are adapted to provide a USB connection, there are twice as many connections for each of the VCC, D−, D+, GND signals. The additional connections for D− and D+ may be used to establish additional data channels, thereby increasing data throughput between devices 100a and 100c.

In some embodiments, the additional connections for VCC and GND may be dynamically re-assigned to serve as data connections, further increasing data throughput between devices 100a and 100c.

Figure 35C:
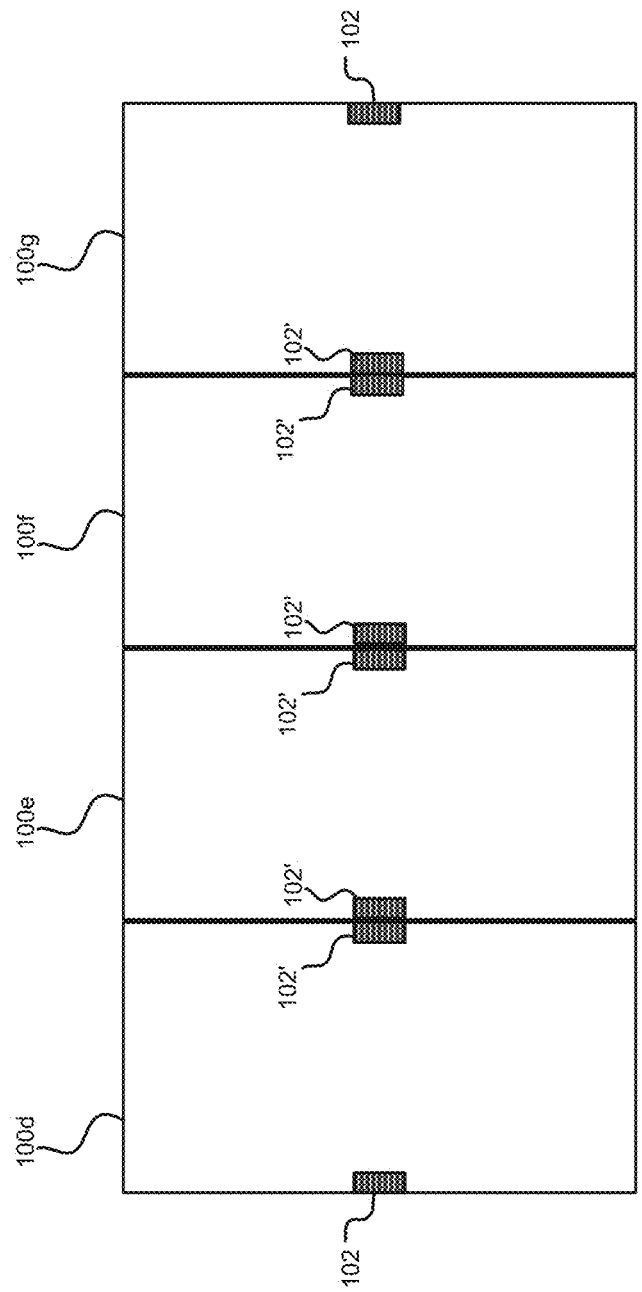

More than two devices may be interconnected by way of connectors 102'. For example, FIG. 35C depicts four devices 100*d*, 100*e*, 100*f*, and 100*g*, all interconnected by way of connectors 102'. An even greater number of devices may be interconnected. The number of devices that be interconnected in this manner may be limited by total current draw of the devices, and the ability of particular protocols to uniquely identify interconnected devices. Various combinations of disparate devices may be interconnected.

For convenience, devices 100*a*, 100*b*, 100*c*, 100*d*, 100*e*, 100*f*, and 100*g* will collectively be referred to as devices 100 and individually be referred to as a device 100.

Figure 36:
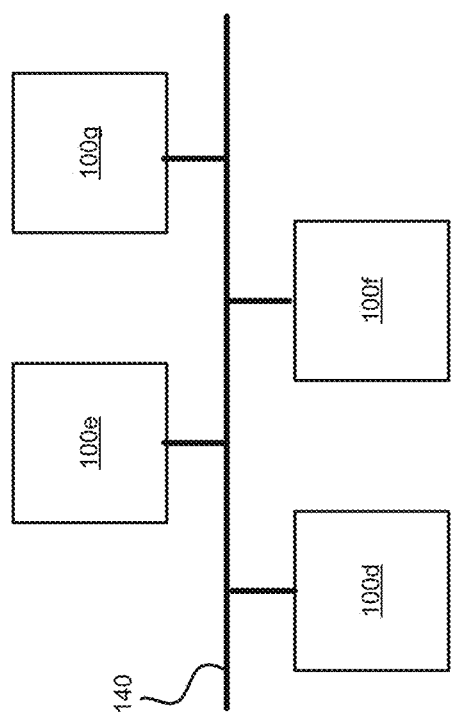
FIG. 36 is a view of computing devices interconnected by a bus, exemplary of an embodiment.

Devices may be interconnected by a single bus. For example, FIG. 36 depicts a single bus (e.g., a USB bus) formed between devices 100*d*, 100*e*, 100*f*, and 100*g* (connected as shown in FIG. 35C). Each device on the bus may communicate with any other device on the bus. So, device 100*d* may communicate with device 100*g*, even though these two devices may not be directly connected (FIG. 35C).

Figure 37:
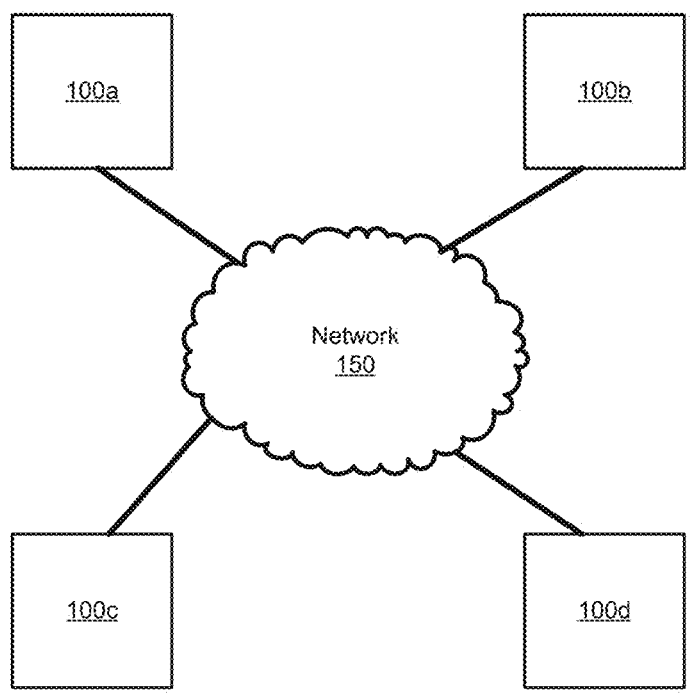
FIG. 37 is a network diagram of computing devices interconnected by a network, exemplary of an embodiment.

Concurrently, interconnected devices 100 may also communicate with one another wirelessly. For example, FIG. 37 depicts a network 150 interconnecting devices 100*d*, 100*e*, 100*f*, and 100*g*. Network 150 may be any network capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WiMAX), SS7 signaling network, fixed line, local area network, wide area network, and others, including any combination of these. Interconnected devices 100 may also communicate with one another by way of near field communication protocol, Bluetooth™ protocol, or an infra-red communication protocol, or the like.

So, devices connected mechanically but not electrically by way of connectors 102, may nonetheless communicate wirelessly.

Figure 39:
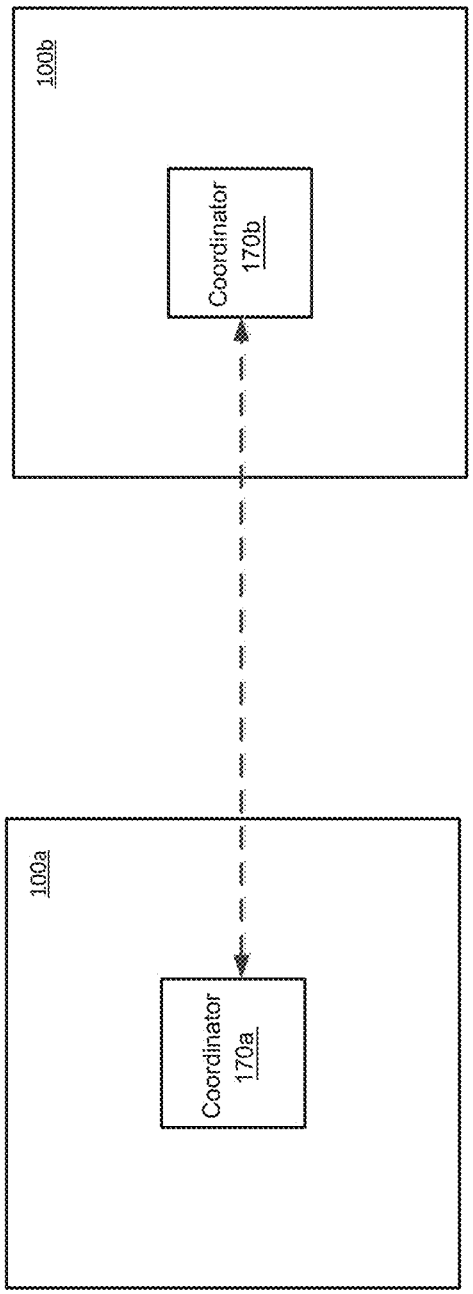
FIG. 39 is a schematic view of software components of interconnected computing devices exemplary of an embodiment.

FIG. 39 is a schematic diagram of a device 100, according to an example embodiment. Device 100 may any conventional computing device, such as a smart phone, tablet computer, laptop computer, desktop computer, workstation, server, portable computer, personal digital assistant, interactive television, video display terminal, gaming console, electronic reading device, any other portable electronic device, or a combination of these. Device 100 may be integrated with a household appliance (e.g., a fridge, oven, washing machine, stereo, exercise bike, alarm clock, or the like), or a vehicle (e.g., on a vehicle dashboard).

In the depicted embodiment, device 100 includes at least one processor 160, memory 162, at least one I/O interface 164, and at least one network interface 166.

Processor 160 may be any type of processor, such as, for example, any type of general-purpose microprocessor or microcontroller (e.g., an ARM™, Intel™×86, PowerPC™ processor or the like), a digital signal processing (DSP) processor, an integrated circuit, a programmable read-only memory (PROM), or any combination thereof.

Memory 162 may include a suitable combination of any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

I/O interface 164 enables device 100 to communicate through connectors 102, e.g., to interconnect with other devices 100. I/O interface 204 also enables device 100 to interconnect with various input and output peripheral devices. As such, device 100 may include one or more input devices, such as a keyboard, mouse, camera, touch screen and a microphone, and may also include one or more output devices such as a display screen and a speaker.

Network interface 166 enables device 100 to communicate with other devices (e.g., other devices 100) by way of a network such as network 150 (FIG. 37).

Device 100 may be adapted to operate in concert with one or more interconnected devices 100. In particular, device 100 may store software code in memory 162 and execute that software code at processor 160 to adapt it to operate in concert with one or more interconnected devices 100. The software code may be implemented in a high level procedural or object oriented programming or scripting language, or a combination thereof. The software code may also be implemented in assembly or machine language.

The software code, when executed, provides a coordinator 170 at each device 100. Coordinator 170 performs various functions, including detection and registration of devices connected to device 100. Coordinator 170 coordinates task sharing between devices, and task assignment from one device to another. Coordinator 170 also coordinates data transfer between devices.

To these ends, coordinator 170 communicates with counterpart coordinators at other devices, e.g., by way of bus 140 or network 150 or both. For example, FIG. 39 shows coordinator 170*a* of device 100*a* communicating with coordinator 170*b* of device 100*b* when devices 100*a* and 100*b* are interconnected by way of connectors 102' (FIG. 35A). Coordinator 170*a* and 170*b* may communicate with one another using any suitable conventional communication protocol. By way of such communication, coordinators 170*a* and 170*b* may establish a peer-to-peer relationship or a master-slave relationship, depending on the nature of the cooperation desired.

So, for example, by way of coordinators 170, a first device 100 may assume control of a second device 100, and control its outputs, receive its inputs, and otherwise access the functionality of the second device. Conversely, the first device 100 may also expose its own inputs, outputs and functionality to the second device.

Coordinator 170 of a device 100 may notify other coordinators at other devices of hardware and software events occurring at device 100. Conversely, coordinator 170 of device 100 may request, from other coordinators, to be notified of hardware and software events occurring at other devices. Such events may, for example, relate to user input, user requests, incoming communication (e.g., SMS messages, phone calls, e-mails), hardware failures, low battery warnings, etc. Each coordinator 170 may be configured to take pre-defined actions in response to being notified of such events.

The operation of coordinator 170*a* is further described with reference to an example application shown in FIGS. 40*a* and 40*b*.

Figure 40B:
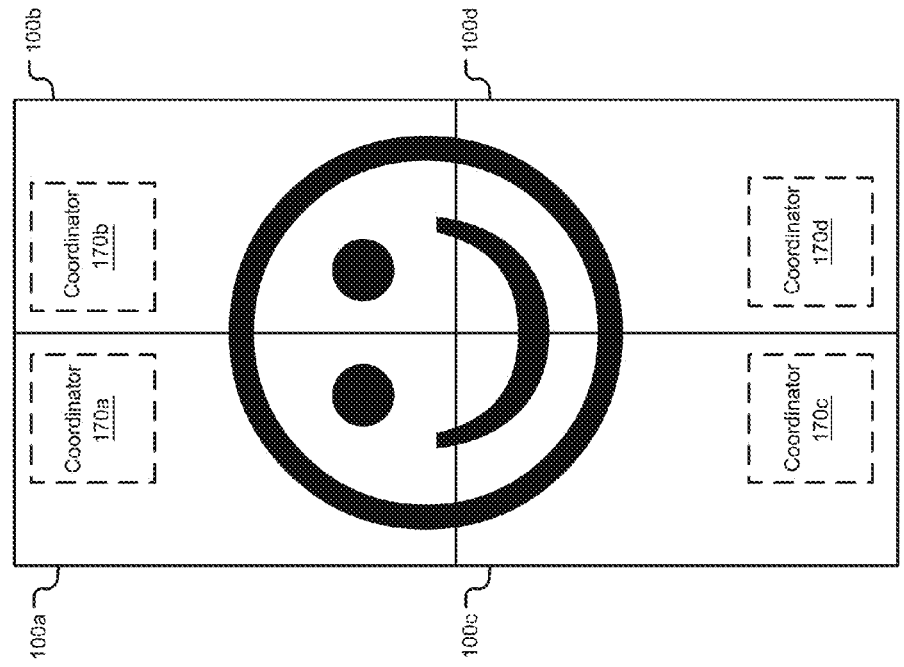
FIGS. 40A and 40B are schematic views of interconnected computing devices cooperating to display an image, exemplary of an embodiment.
Figure 40A:
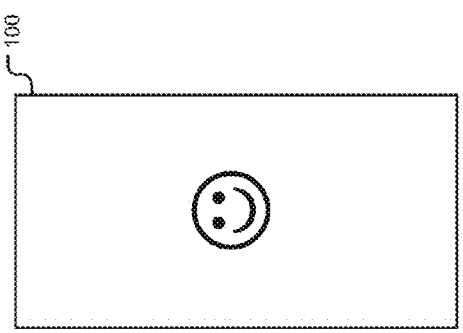

FIG. 40*a* shows a device 100 having a conventional display, which may be an LCD display, an LED display, or the like. Device 100 displays an image (e.g., a happy face) on this display. In this example application, device 100 may be, e.g., a smart phone or a tablet computer.

FIG. 40*b* shows four devices, namely devices 100*a*, 100*b*, 100*c*, and 100*d* interconnected by connectors 102' (not shown). As shown, devices 100*a*, 100*b*, 100*c*, and 100*d* are connected in a 2×2 matrix arrangement. Each of devices 100*a*, 100*b*, 100*c*, and 100*d* includes a conventional display.

Coordinators 170*a*, 170*b*, 170*c*, 170*d* of devices 100*a*, 100*b*, 100*c*, and 100*d* adapt the respective devices to operate in concert; in particular, the coordinator adapt the devices to display an image spanning the displays of the devices.

In an embodiment, coordinator 170a may establish a master-slave relationship with each of the remaining coordinators 170b, 170c, and 170d. As master, coordinator 170a provides instructions and optionally data to each of its slave coordinators 170b, 170c, and 170d. In particular, coordinator 170a may subdivide an image into four quadrants. Coordinator 170a may cause a first image quadrant to be displayed on the display of device 100a. Coordinator 170a may transmit image data corresponding to each one of the remaining image quadrants to a respective one of devices 100b, 100c, and 100d, along with instructions to coordinator 170b, 170c, 170d to display that image data. Such data and instructions may be transmitted by way of the USB connection between the devices, as established using connectors 102'. Coordinators 170b, 170c, and 170d, upon receiving the image data and instructions, may execute the instructions to display the received image data. Consequently, an image may be displayed tiled across the four separate displays of devices 100a, 100b, 100c, and 100d.

Of course, in a similar manner, devices may cooperate to present other forms of data. For example, videos may also be displayed across multiple displays.

Another example application is provided by two interconnected devices 100 operating in concert. In this example, the first device 100 may be a smart phone or a tablet computer, while the second device 100 is a speaker. When the two devices are connected (e.g., by way of connectors 102'), coordinator 170 of the first device causes audio data to be transmitted to the second device, and instructs coordinator 170 of the second device to play that audio data through the speaker.

Yet another example application is provided by two interconnected devices 100 operating in concert. In this example, the first device 100 is a computing device that accumulates user data (e.g., a camera, a workstation, etc.), while the second device 100 is a storage device. When the two devices are connected (e.g., by way of connectors 102'), coordinator 170 of the first device causes user data to be transmitted to the second device, and instructs coordinator 170 of the second device to store that user data in storage memory of the second device 100. In this way, the two devices may cooperate to perform a back-up of user data from the first device 100 to the second device 100.

In a further example, the second device 100 is a power source, e.g., including a chemical cell or a photovoltaic cell, and may be used to provide power to an interconnected first device 100.

In a yet further example, the second device 100 is a data entry device, e.g., a keyboard or a track-pad, and may be used to provide user input to an interconnected first device 100.

The number cooperating devices may be less than four, or greater than four, and is limited only by the number of interconnected devices. The cooperating devices may be a subset of the interconnected devices.

FIGS. 41A and 41B each show a device 100 including a plurality of ferrous strips 130. Strips 130 are each formed from a thin ferrous material and are mounted to a surface of device 100. As shown, each strip 130 is mounted to extend from a connector 102. A strip 130 may be mounted to extend along an edge of device 100 (FIG. 41A). A strip 130 may also be mounted to extend centrally through device 100 (FIG. 41B).

So mounted on device 100, strips 130 provide points of adhesion for magnetic connectors of another device, and provide a guided path for those magnetic connector to move along. For example, a magnetic connector of another device mated to connector 102 of device 100 may be detached from connector 102 to slide along a strip 130 extending therefrom.

In another aspect, any of the connectors disclosed herein may be used in electronic devices (e.g., device 10 and device 12), to facilitate dynamic reconfiguration of the electronic devices during operation. So, there is provided a method of operating electronic devices that includes providing at least two devices, each of the devices including a connector as disclosed herein, connecting the two devices by way of the respective connectors in a first mechanical configuration; and connecting the two devices by way of the respective connectors in a second mechanical configuration different from the first mechanical configuration.

In embodiments, the devices may be reconfigured from the first mechanical configuration to the second mechanical configuration according to any of the manners shown in FIG. 1 through FIG. 11.

Although the disclosure has been described and illustrated with respect to exemplary arrangements and embodiments with a certain degree of particularity, it is noted that the description and illustrations have been made by way of example only. Numerous changes in the details of construction and combination and arrangement of parts and steps may be made.

What is claimed is:

1. A connector for a mobile communications device with a housing having a front surface, an end surface and a side surface, the connector comprising:
   a recess proximate a corner of said housing;
   a magnet coupling received in said recess and operable to form connections for communication with a control unit of the mobile communications device, by magnetic attraction with a plurality of other electronic devices, each adjacent one of said front surface, said end surface and said side surface, such that said magnetic attraction holds said mobile communications device and said plurality of other electronic devices in abutment.

2. The connector of claim 1, wherein said magnet coupling is operable to form a connection with another electronic device adjacent one of said front surface, said end surface and said side surface and maintain said connection during rotation of said another electronic device to a position adjacent a different one of said front surface, said end surface and said side surface.

3. The connector of claim 2, wherein said magnet coupling is operable to form a connection with said another electronic device adjacent said front surface and maintain said connection during rotation of said another electronic device to a position adjacent said side surface.

4. The connector of claim 1, wherein said magnet coupling is configured to concurrently form connections with a first device adjacent said front surface, a second device adjacent said end surface and a third device adjacent said side surface.

5. The connector of claim 1, wherein said magnet coupling comprises a magnet rotatable within said recess between a first orientation for forming a connection with a device adjacent a first one of said front, end and side surfaces, a second orientation for forming a connection with a device adjacent another of said front, end and side surfaces, and a third orientation for concurrently forming connections with devices adjacent multiple ones of said front, end and side surfaces.

6. The connector of claim 1, wherein said connections comprise a data connection.

7. The connector of claim 1, wherein said connections comprise a power connection.

8. The connector of claim 1, wherein said magnet coupling comprises a cylindrical magnet.

9. The connector of claim 1, wherein said magnet coupling comprises a spherical magnet.

10. The connector of claim 1, wherein said magnet coupling comprises an electromagnet.

11. The connector of claim 1, comprising one or more electrical contacts adjacent said magnet for forming electrical connections with devices adjacent to each of said front, end and side surfaces.

12. A method of connecting a mobile communication device with a first electronic device, comprising:
   positioning said mobile communication device and said first electronic device in a first configuration with side surfaces facing and adjacent one another, with a magnetic connector of said first electronic device proximate a magnetic connector of said mobile communication device;
   holding said first electronic device and said mobile communication device in said first configuration by magnetic attraction of said magnetic connectors;
   positioning said first electronic device and said mobile communication device in a second configuration with front or rear surfaces facing and adjacent one another with said magnetic connector of said first electronic device proximate said magnetic connector of said mobile communication device; and
   holding said first electronic device and said mobile communication device in said second configuration by magnetic attraction of said magnetic connectors.

13. The method of claim 12, comprising positioning a third electronic device with a front or rear surface adjacent and facing said front or rear surface of said mobile communication device with a magnetic connector of said third device proximate said magnetic connector of said mobile communication device, and forming a connection between said mobile communication device and said third device by magnetic attraction of said magnetic connectors, while said first device is adjacent said side surface of said mobile communication device.

14. The method of claim 12, comprising forming a data connection between said first electronic device and said mobile communication device by magnetic attraction.

15. The method of claim 12, comprising forming a power connection between said first electronic device and said mobile communication device by magnetic attraction.

16. The method of claim 12, comprising magnetically rotating said magnetic connector of said mobile communication device to a first orientation for forming a connection to a device adjacent said front or rear surface and a second orientation for forming a connection to a device adjacent said side surface.

17. The method of claim 16, comprising magnetically rotating said magnetic connector to a third orientation for concurrently forming connections to a first device adjacent said front surface, a second device adjacent said rear surface and a third device adjacent said side surface.

18. The method of claim 12, wherein said magnetic connector of said mobile communication device comprises an electromagnet, the method comprising activating said electromagnet.

19. The method of claim 12, comprising rotating said first electronic device and said mobile communication device from said first configuration to said second configuration without breaking a magnetic attraction between said first electronic device and said mobile communication device.

20. The method of claim 12, wherein said magnetic connector of said mobile communication device comprises a Hall cylindrical magnet.

21. The method of claim 12, wherein said magnetic connector of said mobile communication device comprises a spherical magnet.

22. An electronic device comprising the connector of claim 1.

\* \* \* \* \*